(12) United States Patent
Yasukata et al.

(10) Patent No.: US 6,709,754 B1
(45) Date of Patent: Mar. 23, 2004

(54) STYRENE RESIN FILMS

(75) Inventors: Kouichi Yasukata, Mie (JP); Manabu Tanuma, Mie (JP); Yoshiyuki Tazuke, Mie (JP); Osamu Mizukami, Mie (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/148,487

(22) PCT Filed: Jul. 24, 2000

(86) PCT No.: PCT/JP00/04931

§ 371 (c)(1),
(2), (4) Date: May 30, 2002

(87) PCT Pub. No.: WO01/40360

PCT Pub. Date: Jun. 7, 2001

(30) Foreign Application Priority Data

Nov. 30, 1999 (JP) .......................................... P.11-339743
Dec. 27, 1999 (JP) .......................................... P.11-371084

(51) Int. Cl.$^7$ ............................ B32B 27/32; B32B 9/04; B05D 3/00
(52) U.S. Cl. ...................... 428/447; 428/341; 428/409; 428/523; 427/535; 427/536; 427/322
(58) Field of Search .................................. 428/332, 340, 428/341, 447, 448, 521, 522, 523, 409; 427/532, 533, 535, 536, 299, 322, 424, 425; 229/68.1, 300, 303

(56) References Cited

U.S. PATENT DOCUMENTS

| | | | |
|---|---|---|---|
| 3,392,133 A | | 7/1968 | Stickelmeyer |
| 4,367,312 A | * | 1/1983 | Bontinck et al. ............. 525/93 |

FOREIGN PATENT DOCUMENTS

| | | |
|---|---|---|
| EP | 0 329 376 | 8/1989 |
| GB | 1007183 | 10/1965 |
| GB | 1014687 | 12/1965 |
| JP | 53-115781 | 10/1978 |
| JP | 5-98054 | 4/1993 |
| JP | 9-295384 | 11/1997 |
| JP | 10-119978 | 5/1998 |
| JP | 11-209491 | 8/1999 |
| JP | 2000-1555 | 1/2000 |

\* cited by examiner

*Primary Examiner*—Robert Dawson
*Assistant Examiner*—Michael J Feely
(74) *Attorney, Agent, or Firm*—Birch, Stewart, Kolasch & Birch, LLP

(57) ABSTRACT

Styrene resin films having been imparted antistatic properties to both film surfaces and good adhesion properties of the films to envelope paper, and a process for producing the same. In these styrene resin films, the surface tension of the front surface of the film base differs from the surface tension of the back surface owing to a hydrophilic treatment and modifiers having almost the same compositions are applied onto the respective surfaces each in an adequate weight.

12 Claims, No Drawings

STYRENE RESIN FILMS

This application is the national phase under 35 U.S.C. §371 of PCT International Application No. PCT/JP00/04931 which has an International filing date of Jul. 24, 2000, which designated the United States of America.

TECHNICAL FIELD

This invention relates to a hydrophilic treatment of films made of styrene resins and application of modifiers to improve, for example, the antistatic properties and slip properties of the films. More particularly, it relates to films to be mechanically processed with, for example, a bag-forming apparatus or a window film applicator, in particular, styrene resin films suitable for window film application.

BACKGROUND ART

Because of being stiff and highly transparent, styrene resin films have been frequently employed as food packaging films for lettuces, raw shiitake and bananas and window films (i.e., films to be applied to envelope windows).

Styrene resin films are employed as food packaging films, since they exhibit excellent food visibility due to the high transparency and high steam-permeability, thereby keeping the freshness of foods with much transpiration (for example, raw shiitake) over a prolonged period of time. Polyethylene films and polypropylene films, which have low steam-permeability, are unsuitable for packaging foods with much transpiration.

In particular, styrene resin films are frequently employed as envelope window films, since less stiff films (for example, polyethylene films, polypropylene films) suffer from troubles such as wrinkling in the step of windowing envelopes and therefore are unsuitable for this purpose.

As an example of the utilization of a styrene resin film in food packaging bags for keeping freshness, JP-A-8-230933 discloses a styrene resin film (the term "JP-A" as used herein means an "unexamined published Japanese patent application"). This film can be processed in sheet form into bags in which foods are filled by hand. However, this film has been subjected to no surface treatment, which brings about a problem of shear in bag-forming because of the insufficient slip properties and opening properties (i.e., easiness in opening the bags for filling foods therein) in the step of automatically filling foods (for example, shiitake) into the bags, in particular, processing the film into bags at a high speed and automatically filling foods in the bags.

In recent years, bananas are packaged in a bag formed by fuse-sealing three sides of a monolayer styrene resin film piece. To wrap a bulky food such as bananas, the bag should be provided with a wide opening. Thus, static electrification due to friction of the upper and lower film sheets makes it difficult to open the bag, thereby causing a problem that bananas can be hardly put into the bag.

To solve this problem, there have been reported styrene resin films coated with modifiers on the film surface. However, these styrene resin films suffer from various problems as will be discussed hereinafter.

As described above, it has been a practice to carry out various surface treatments for improving the slip properties of styrene resin film bases and imparting antistatic properties thereto to thereby give styrene resin films appropriately withstanding mechanical processing, for example, bag-formation and envelope window film application.

For example, JP-A-53-115781 proposes a method whereby a styrene resin film base surface is subjected to a hydrophilic treatment (for example, corona discharge) to give a surface tension of 400 to 550 µN/cm and then a modifier containing an anticlouding agent and silicone oil is applied on the base surface. According to this technique, one surface of the film base is exclusively subjected to the corona discharge and the modifier is applied onto the thus treated surface. On the other hand, JP-A-10-119978 discloses a method of applying an antistatic agent onto both surfaces of a base material.

Recently, the processing speeds of bag-forming machines, in particular, window film applicators and automatic paper feeders have been elevated to 1,000 sheet/minute or more, over the machines currently in use (i.e., 400 to 600 sheet/minute). With this tendency toward higher processing speeds, it becomes necessary that a window film has two conflicting characteristics, namely, antistatic properties of both surfaces and adhesiveness to paper. It is true that the film disclosed by JP-A-10-119978 suffers from less trouble exclusively from the view point of static electricity. However, it is provided with no means of preventing film scratches. In addition, the problems of wrinkling and positioning error after adhesion are not completely solved in this case. Namely, the problem of static electricity can be solved merely by applying a large amount of an antistatic agent to the film base surfaces to thereby enhance the antistatic properties. However, this treatment brings about another trouble that the antistatic agent applied thickly prevents an adhesive from attaining the film base surfaces and solidifying thereon, thus causing wrinkling and positioning error.

On the other hand, JP-A-2-72050 discloses a styrene resin film containing a waxy antiblocking agent, while JP-A-2-72051 discloses a styrene resin film containing a granular antiblocking agent. Although the films reported in these documents show relieved film damage due to the improved slip properties, they still suffer from the problem of the frequent occurrence of troubles due to static electricity.

By the antistatic treatment on exclusively one surface according to JP-A-53-115781, the obtained film is hardly used for window film application. A styrene resin film roll set in a window film applicator is unwound and then brought into contact with metal rollers or rubber rollers before the adhesion of the film to the envelope paper. Since plural rollers are employed in the contact step, both surfaces of the film come into contact with the rollers and thus electrostatically charged. Unless the film has the antistatic properties on both surfaces, the film sheets, having been cut into a definite size, wind around each other immediately before coming into contact with the envelope paper, thus making continuous processing impossible.

Therefore, double-side application is employed in the thermoplastic resin film for envelope windowing according to JP-A-10-119978. However, this double-side application disclosed in this document suffers from the following problem.

Namely, the film for a window film applicator disclosed in this document is not subjected to any hydrophilic treatment on both surfaces but an antistatic agent is applied on both surfaces of the film in almost the same coating weights, followed by winding into a roll. The film roll thus formed is put into the window film applicator and then unwound before using as a film. In the unwinding step, however, there arises a problem that the antistatic agent, which has been applied onto both surfaces in the same weight, partly (or mostly in an extreme case) migrates from one surface to the opposite surface, depending on the winding tension and other environmental factors (for example, temperature, humidity) in the winding step and the storage conditions (for example, temperature, humidity) of the rolled film. As a result, the coating weight of the antistatic agent widely varies lengthwise. When the film surface having a large amount of the antistatic agent thereon is to be adhered to the envelope paper, the antistatic agent interferes the adhesion and thus causes positioning error between the film and the envelope window, thereby damaging the commercial value of the product.

The invention aims at imparting antistatic properties to both surfaces of a film to thereby provide a film which is suitable for mechanical processing with the use of, for example, a high-speed printer, a bag-forming machine or a high-speed window film applicator, in particular, a styrene resin film having improved adhesion properties to paper as required in an envelope window film applicator, and a process for producing the same.

DISCLOSURE OF THE INVENTION

The present inventors have conducted intensive studies to solve the above-described problems. As a result, they have successfully found out that the object can be achieved by imparting different surface tensions to the front and back surfaces of a film base through a hydrophilic treatment and then applying almost the same modifier compositions on both surfaces of the film base each in an appropriate coating weight. The invention has been completed based on this finding.

Accordingly, the invention provides a styrene resin film comprising a styrene resin film base subjected to a hydrophilic treatment on both surfaces and a composition containing at least one antistatic agent and an external slip agent applied onto each of the treated surfaces, wherein the ratio ($\alpha/\beta$) of the surface tension ($\alpha$) of one surface (A) of the film base to the surface tension ($\beta$) of the opposite surface (B) is from 1.15 to 1.72; the surface tension ($\beta$) is from 350 $\mu$N/cm to 450 $\mu$N/cm; the surface tension ($\alpha$) is from 400 $\mu$N/cm to 600 $\mu$N/cm; and the coating weight of the composition on the surface (B) amounts to 25 to 95% by weight of the coating weight of the composition on the surface (A).

Moreover, the invention provides a process for producing a styrene resin film which comprises: performing a hydrophilic treatment so that the surface tension ($\alpha$) of one surface (A) of a film base is controlled to 400 to 600 $\mu$N/cm, the surface tension ($\beta$) of the opposite surface (B) of the film base is controlled to 350 to 450 $\mu$N/cm and the surface tension ratio $\alpha/\beta$ is controlled to 1.15 to 1.72; applying a composition containing at least an antistatic. agent and an external slip agent onto the surface (A); after drying, winding up the styrene resin film into a roll; and thus transferring the composition on the surface (A) to the surface (B).

BEST MODE FOR CARRYING OUT THE INVENTION

Now, the invention will be described in detail.

The film base to be used in the invention contains as the main component a styrene resin. That is, the content of the styrene resin amounts to 50% by weight or more of the resin composition constituting the film. The styrene resin to be used in the invention is a transparent polymer containing 50% by weight or more of styrene monomer. Examples thereof include publicly known polymer resins such as polystyrene, styrene-acrylonitrile copolymer, styrene-methyl methacrylate copolymer and styrene-butadiene-methyl methacrylate terpolymer; so-called rubber-modified polystyrene resins containing synthetic rubber (for example, butadiene, styrene-butadiene random copolymer, styrene-butadiene block copolymer) dispersed therein as soft components; and block copolymers of styrene with conjugated dienes. Among all, it is favorable to use therefor general-purpose polystyrene (GPPS) or a resin prepared by dispersing a synthetic rubber in general-purpose polystyrene.

The styrene resin film to be used as the film base per se has a hydrophobic nature on both surfaces. When an aqueous modifier-containing solution prepared by dissolving an antistatic agent or an anticlouding agent in water is applied on the film surface, therefore, droplets of the aqueous modifier-containing solution are formed thereon and thus uniform application becomes impossible. In addition, an aqueous emulsion, which is employed as an adhesive in the step of adhering the film surface to envelope paper, should quickly attain the base surface and solidify thereon. Thus, it is needed to make the film surfaces hydrophilic. As will be described hereinafter, the hydrophilic treatment can be performed by using an acid (for example, sulfuric acid, nitric acid) or by a plasma treatment (for example, corona discharge).

It is essentially required in the invention that the styrene resin film base surfaces are subjected to the hydrophilic treatment so as to give a surface tension ratio of the front and back surfaces ($\alpha/\beta$) falling within a specific range. To obtain a styrene resin film suitable for a window film applicator or an automatic paper feeder (hereinafter referred to simply as a window film applicator in some cases), it is particularly necessary to vary the extent of the hydrophilic treatment on these surfaces. In case of using the styrene resin film as a window film of an envelope or a sheet, the styrene resin film is to be adhered to the inside of the adherend (for example, an envelope) and thus the film surface (A') serves as the innermost surface of the envelope. When the film surface (A') is electrostatically charged in the step of window film application, the film surface (A') attracts the adherend owing to the static electricity and thus the envelope can be hardly opened, thereby making it impossible to put papers into the envelope. Since the papers are enveloped or located while being in contact with the inner surface of the adherend, the film surface (A') is electrostatically charged due to the frictional charge and, in its turn, the papers per se are also electrostatically charged. In an automatic paper feeder of strict type, the film surface (A') is electrically charged and papers are also charged and thus the papers cannot be inserted due to the static electricity. Accordingly, it is necessary that the film surface (A') has sufficiently higher antistatic properties than the film surface (B').

On the other hand, the film surface (B') should have antistatic properties too so as to prevent the problem that film sheets wind around each other due to the static electricity in the step of running the films on plural rollers in a window film applicator. It is also necessary that the film surface (B') has appropriate adhesion properties to the adherend. To achieve these objects, the film surface (B') should have lower antistatic properties by a specific ratio than the film surface (A') and ensure the adhesion of the adhesive. It is therefore needed in the invention to control the ratio of the surface tension ($\alpha$) of the surface (A) of the film base to the surface tension ($\beta$) of the other surface (B) of the film base (i.e., $\alpha/\beta$) to 1.15 to 1.72. Particular reason therefor is as follows.

When the surface tension ratio falls within the range of from 1.15 to 1.72, a large amount of the modifier composition remains on the film surface (A') after unwinding the film roll, even though the film is affected by the winding tension in the winding step or the storage temperature and humidity. Thus, both surfaces can sustain respectively the appropriate antistatic properties and attainment times of the adhesive. It is preferable that the surface tension ratio is from 1.20 to 1.60.

When the surface tension ratio is less than 1.15, it becomes impossible to control the coating weights of the modifier composition on the film surfaces (A') and (B'), depending on the winding tension in the winding step or the storage temperature and humidity, as in the case where the base surfaces are not subjected to the hydrophilic treatment. When the surface tension ratio exceeds 1.72, on the other hand, the peeling force between film sheets becomes excessively high, in spite of the modifier composition applied thereon, and thus the film roll can be hardly unwound.

As described in Examples 3 and 5 of JP-A-10-119978, it is obvious that the coating weights of the modifier composition on the film surfaces (A') and (B') cannot be anticipated, in case of applying the composition on these surfaces without performing the hydrophilic treatment. Thus, it is advantageous as a food packaging film too that the film surfaces (A') and (B') have different properties from each other as described above.

When a styrene resin film is laminated on another resin film as in JP-A-8-230933, the surface (B') may be employed as the film surface on which the other film is laminated. Thus, the adhesion strength can be maintained on the surface with less coating weight while the film surface (A') superior in the slip properties and the antistatic properties can regulate the occurrence of shear in bag-forming during the automatic bag-forming process.

In a bag having a large opening for wrapping, for example, bananas, the film surface (A') is made inside so that the bag can be easily opened owing to the antistatic properties of the surface (A').

Similarly, particular surface tension values of the base surfaces are restricted to certain ranges for the following reasons, thereby facilitating the achievement of the objects of the invention.

The surface tension ($\alpha$) of the film base surface (A) is controlled to a range of from 400 $\mu$N/cm to 600 $\mu$N/cm by the hydrophilic treatment. So long as the surface tension falls within this range, the modifier composition can be more uniformly applied on the base surface and the film base surface can be adequately activated so that blocking of film sheets (i.e., a phenomenon causing an increase in the peeling force between film sheets) scarcely arises. The surface tension ($\alpha$) preferably ranges from 430 $\mu$N/cm to 580 $\mu$N/cm, still preferably from 450 $\mu$N/cm to 550 $\mu$N/cm.

The surface tension ($\beta$) of the opposite surface (B) of the film base is from 350 $\mu$N/cm to 450 $\mu$N/cm. When this surface tension is 350 $\mu$N/cm or more, the film surface shows an improved affinity for the adhesive and thus the attainment of the adhesive to the base surface and the solidification thereon can be quickly completed. As a result, the adhesion force between the film and paper can be enhanced and the adhesion time can be shortened, which is appropriate particularly in high-speed window film application at 1,000 sheet/minute or more. It is preferable that the surface tension ($\beta$) is 380 $\mu$N/cm or more.

The upper limit of the surface tension ($\beta$) is 450 $\mu$N/cm. When the surface tension of the film base surface (B) exceeds 450 $\mu$N/cm, the surface tension of the film base surface (A) becomes at least 515 $\mu$N/cm because of the definition of the surface tension ratio. In such a case, the film roll can be hardly unwound and the obtained film is hardly used especially in high-speed window film application at 1,000 sheet/minute or more. This is because the coating weight on the film surface (B') is smaller than the coating weight on the film surface (A') and therefore the peeling force between film sheets is excessively elevated due to the synergistic effect with the activated film base surface (A), when the surface activity of the film surface (B) is too much elevated by the hydrophilic treatment. It is preferable that the surface tension ($\beta$) of the film base surface (B) is 430 $\mu$N/cm or less. As described above, the peeling force between film sheets is elevated by the synergistic effect of the film surface (A), which has been activated by the hydrophilic treatment, and the film base surface (B) and, in its turn, the peeling force between the film and the adherend is seemingly elevated too.

Next, the composition containing an antistatic agent and an external slip agent (hereinafter referred to as the modifier composition) which is to be applied onto the film base surfaces (A) and (B) will be illustrated in greater detail.

Examples of the antistatic agent include conductive fillers such as carbon black and nickel powder and surfactants having antistatic properties.

The former antistatic agents (i.e., conductive fillers) leak static electricity due to the surface contact among conductive particles, while the latter antistatic agents (i.e., antistatic surfactants) leak static electricity because of the hygroscopic or ionic natures thereof. It is not favorable to use such a conductive filler, since it should be applied in a large amount to ensure the leakage of the static electricity due to the surface contact among the microparticles and thus the transparency is worsened thereby. Therefore, it is preferred to use the latter ones (i.e., surfactants).

The external slip agent is used in order to improve the slip properties. When present on the surface, it imparts lubricating action or slip properties on the basis of the principle of the mechanism of rollers.

Examples of the external slip agent imparting lubricating action include silicone oils, waxes and surfactants as will be described hereinafter. As an example of the silicone oils, dimethyl silicone oil may be cited. Examples of the waxes include amide type lubricants (for example, stearic acid amide, erucic acid amide) and ester type lubricants (for example, butyl stearate, stearic acid monoglyceride). Examples of microparticles include silicone dioxide, talc and calcium carbonate. Although oil-soluble lubricants (for example, silicone oils and waxes) are appropriate for improving the slip properties, it is unfavorable to use these lubricants since they lower the sealing strength in bag-forming or worsen the adhesion properties of the film to paper.

Preferable examples of the antistatic agent include surfactants having antistatic properties as will be described hereinafter, polyoxyethylenealkylamines and polyoxyethylene polyoxypropylene glycol ether. Preferable examples of the external slip agent include inorganic particles as will be described hereinafter and polyether-modified silicones.

The external slip agent is added at a weight ratio of generally from 0.01 to 3, preferably from 0.05 to 2.5, based on the antistatic agent.

As preferred constitution of the invention, the following three types of modifier compositions may be presented. Namely, the first modifier composition contains a surfactant as the antistatic agent, inorganic microparticles as the external slip agent, and further a water soluble polymer; the second modifier composition contains a surfactant as the antistatic agent, a specific polyether-modified silicone as the external slip agent, and further a water soluble polymer; and the third modifier composition contains a specific polyoxyethylenealkylamine or polyoxyethylene polyoxypropylene glycol ether as the antistatic agent and a specific polyether-modified silicone as the external slip agent.

In some cases, either the antistatic agent or the external slip agent has the function of the other too.

Now, the first modifier composition in the invention will be illustrated.

In the first modifier composition, use can be made of a surfactant having antistatic properties as the antistatic agent. Examples of the surfactant for use herein include aninonic surfactants (for example, carboxylic acid salts, sulfonic acid salts, sulfate salts, phosphate salts, phosphonic acid salts), cationic surfactants (for example, amine salts, quaternary ammonium salts, sulfonium salts), amphoteric surfactants (for example, betaine type surfactants, imidazoline type surfactants), and nonionic surfactants (for example, polyhydric alcohol type fatty acid monoglycerol esters, fatty acid polyglycol esters, fatty acid sorbitan esters, fatty acid sucrose esters, fatty acid alkanolamide-polyethylene glycol fused fatty acid, aliphatic alcohols, aliphatic amines, alkyl phenols, polypropylene glycol). It is preferable to use an amphoteric surfactant or a nonionic surfactant, since stable antistatic properties can be obtained thereby. It is also possible to use a combination of two or more of these surfactants.

Examples of the inorganic microparticles include microparticles of silicon dioxide, silicates, synthetic zeolite, calcium carbonate and magnesium carbonate. Owing to the function of these inorganic microparticles, the slip properties of the film can be improved and the peeling force between film sheets can be lowered after winding into a roll. These inorganic microparticles should have an inner surface area preferably ranging from 0.5 to 4.0 $m^2/g$ in terms of specific surface area. The preferable particle diameter ranges from 1 to 7 $\mu$m, still preferably from 2 to 5 $\mu$m, in terms of number-average particle diameter. It is favorable to use silicon dioxide microparticles in view of the particle diameter and the inner surface area. Because of having the inner surface area, portions of the surfactant and the water soluble polymer are incorporated into the microparticles and thus the fixing force of the surfactant can be elevated, compared with the case of using the water soluble polymer alone. When the number-average particle diameter falls within the range of 1 to 7 $\mu$m, the microparticles scarcely fall out during being in contact with rollers of a window film applicator and the fixing power of the surfactant is elevated.

Examples of the water soluble polymer include polyvinyl alcohol, polyvinyl pyrrolidone, sodium polyacrylate, sodium polystyrenesulfonate and methylcellulose. Among all, polyvinyl alcohol is preferable from the viewpoints of solubility in water and fixing power.

It is further preferable that polyvinyl alcohol has a degree of saponification of from 40 to 99% by mol, still preferably from 60 to 95% by mol. When the degree of saponification falls within this range, an aqueous solution of the polyvinyl alcohol can be easily prepared and the film strength is not deteriorated. As a result, there arise no fear of staining rollers, when the film comes into contact with the rollers. The molecular weight of the water soluble polymer generally ranges from 100 to 15,000, preferably form 200 to 5,000. Use of the water soluble polymer facilitates the uniform application of the modifier composition, in addition to the effects as will be described hereinafter.

To satisfy the requirements in case of processing the film according to the invention with the use of a high-speed printer, a bag-forming machine or a high-speed window film applicator, the first modifier composition contains not only the surfactant as described above but also the water soluble polymer and the inorganic microparticles. By adding the water soluble polymer and the inorganic microparticles, the surfactant is strongly fixed to the film surface and thus rollers of various apparatuses can be prevented from staining. Moreover, the inorganic microparticles can be prevented from falling out from the film surface due to the synergistic effect of the water soluble polymer and the inorganic microparticles.

In the first modifier composition, the most suitable mixing ratio by weight of (a) the surfactant, (b) the water soluble polymer, and (c) the inorganic microparticles (i.e., (a):(b):(c)) is 1:0.03 to 3:0.01 to 1.25.

When the composition ratio of the water soluble polymer is from 0.03 to 3, it exerts a strong fixing power to the surfactant and thus the surfactant scarcely peels off from the film surface. In this case, the effects of the surfactant can be easily exerted, and thus the antistatic properties are improved.

When the composition ratio of the inorganic microparticles is from 0.01 to 1.25, the fixing effect of the surfactant can be achieved owing to the synergistic effect of the water soluble polymer and the inorganic microparticles and thus the inorganic microparticles scarcely fall out from the film surface.

The desired level of the antistatic properties or the slip properties (i.e., the coefficient of dynamic friction) varies depending on the purpose of use.

In case of using the film as a food packaging film and processing into bags while automatically filling a food therein, for example, automatic filling can be carried out without causing shear in bag-forming by controlling the coefficient of high-speed dynamic friction between the film and a metal to 0.15 to 0.57 and controlling the half-life of electrostatic attenuation (20° C., relative humidity 25%) to 300 seconds or less.

In case of using the film of the invention in window film application, for example, high-speed processing (1,000 sheet/min or more) can be carried out without causing any troubles such as wrinkling by controlling the coefficient of high-speed dynamic friction between the film and a metal to 0.15 to 0.35 and controlling the half-life of electrostatic attenuation (20° C., relative humidity 25%) to 90 seconds or less.

To satisfy these requirement, the modifiers are to be applied on the film base surfaces respectively in the following weights: (a) from 2.0 to 15 $mg/m^2$ (preferably from 3 to 12 $mg/m^2$), (b) from 0.5 to 6 $mg/m^2$ (preferably from 0.5 to 4 $mg/m^2$), and (c) from 0.2 to 2.5 $mg/m^2$ (preferably from 0.3 to 2.0 $mg/m^2$, still preferably from 0.3 to 1.8 $mg/m^2$). A coating weight of the surfactant of 2 to 15 $mg/m^2$ is suffice for achieving antistatic effect. In this case, moreover, the inorganic microparticles are not embedded in the coating layer but appropriately coated with the surfactant. When processed with a window film applicator, therefore, the thus obtained film suffers from little wrinkling or positioning error caused by static electricity.

The water soluble polymer is employed together with the surfactant in order to retain the inorganic microparticles on the film surface. Since the surfactant alone can achieve only an insufficient effect of retaining the inorganic microparticles, the water soluble polymer is added as a so-called adhesion enhancer for strengthening the adhesive force. To establish the aimed effect, the coating weight of the water soluble polymer preferably ranges from 0.5 to 6 mg/m². When the coating weight of the water soluble polymer falls within this range, a sufficient effect of retaining the inorganic microparticles can be established and thus scratches are scarcely formed due to the fall-out of the inorganic microparticles from the film surface. In this case, moreover, the antistatic properties of the surfactant are not deteriorated and the slip properties are not deteriorated due to the excessively elevated adhesiveness on the film surface.

When the coating weight of the inorganic microparticles is from 0.2 to 2.5 mg/m², a sufficient number of inorganic microparticles can be dispersed to form projections thereby achieving the effect of improving the slip properties. In addition, little inorganic microparticles fall out from the film and, therefore, the film suffers from few scratches in this case.

Next, the second modifier composition will be illustrated.

The second modifier composition contains a polyether-modified silicone, a surfactant and a water soluble polymer. One of the characteristics of this combination resides in that the slip properties can be improved thereby without resort to any inorganic microparticles and thus it is unnecessary to give attention to prevent the fall-out of inorganic microparticles from the film. The inventors have found out a modifier capable of achieving slip properties without resort to inorganic microparticles, namely, a polyether-modified silicone and thus disclosed the same as the second modifier composition.

The polyether-modified silicone disclosed in the invention has a structure represented by the following formula (1) wherein the methyl groups of dimethyl silicone have been partly modified with polyoxyethylene and polyoxypropylene groups.

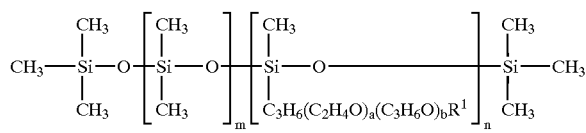

(1)

In formula (1), $R^1$ represents a hydrogen atom or a lower alkyl group having 1 to 4 carbon atoms; m is an integer of from 0 to 80 and n is an integer of from 1 to 30, provided that m+n is an integer of from 1 to 100 and the ratio n/(n+m) is from 0.1 to 1.0; and a is an integer of from 5 to 30 and b is an integer of from 0 to 30, provided that a+b is an integer of from 5 to 60 and the ratio a:b is from 100:0 to 100:50.

In the polyether-modified silicone of formula (1), it is still preferable that m is an integer of from 1 to 30; the ratio n/(n+m) is from 0.3 to 1.0; a+b is from 5 to 15; and the ratio a:b is from 100:0.

In case where the polyether-modified silicone alone is used as a modifier to achieve satisfactory antistatic properties and slip properties, the polyether-modified silicone should be applied onto the film in a larger weight than, for example, the surfactant. Due to the low surface tension of silicone molecules, there is observed a tendency that the water-repellency of the film surface is unnecessarily elevated. Therefore, the film sometimes shows poor adhesion properties to an adhesive and thereby causes positioning error, when it is to be adhered to paper by using a window film applicator.

In styrene resin films, it is frequently observed that films carrying modifiers (for example, surfactants) applied thereon are recycled and reused. Since the polyether-modified silicone is incompatible with styrene resins, films containing the polyether-modified silicone in a large amount are whitened and worsened in transparency, which makes the recycle of these films difficult.

In the second modifier composition, the polyether-modified silicone is used together with a surfactant and, therefore, the content of the polyether-modified silicone can be reduced. The surfactant to be used in this case may be an arbitrary one selected from among the anionic, cationic and nonionic surfactants as described above. In this second combination, the water soluble polymer is further added so that the water soluble polymer fixed to the film base surface and retain the surfactant. Owing to this constitution, the surfactant can be uniformly dispersed on the film base surface, thereby achieving stable antistatic properties.

In the second modifier composition, the preferable composition ratio by weight of (a) the surfactant, (b) the water soluble polymer, and (c) the polyether-modified silicone (i.e., (a):(b):(c)) is 1:0.03 to 2.0:0.1 to 5.7. When the composition ratio falls within this range, the obtained film is appropriately processed with the use of, for example, a window film applicator.

It is favorable that the composition contains from 10 to 85% by weight of the polyether-modified silicone, from 15 to 90% by weight of the surfactant and from 3 to 30% by weight of the water soluble polymer.

By controlling the content of the polyether-modified silicone to 10% by weight or more, appropriate slip properties, sufficient slip properties and an antiblocking effect (a decrease in peeling force) can be obtained. As a result, the film scarcely suffers from positioning error or winding in the step of, for example, window film application. Moreover, the film shows an adequate adhesive force to paper and is free from any decrease in transparency in the course of recycling.

By controlling the content of the surfactant to 15% by weight or more, good antistatic properties can be imparted to the film, in particular, under less humid conditions (20° C., relative humidity 20%). As a result, the film scarcely suffers form blocking or positioning error in the step of envelope window film application. In addition, this film is excellent in the friction between film sheets and antiblocking properties and, therefore, scarcely winds around each other in envelope window film application. Moreover, it shows an appropriate peeling force between film sheets, which ensures stable unwinding of the film roll.

By further controlling the content of the water soluble polymer to 3 to 30% by weight, the surfactant can be uniformly dispersed even though the polyether-modified silicone has a low surface tension. Thus, the surfactant can be uniformly fixed to the film base surface. This is seemingly established by the affinity of the water soluble polymer for the surfactant. The obtained film is less sticky and the surfactant is uniformly dispersed therein, thereby showing little scatter in the slip properties and antistatic properties.

From the viewpoint of the balance of the properties as described above, it is still preferable that the contents of the polyether-modified silicone, the surfactant and the water soluble polymer are controlled respectively to 40 to 60% by weight, 60 to 40% by weight and 5 to 25% by weight.

The coating weight of the modifier composition onto the film base surface preferably ranges from 2 to 30 mg/m², still preferably from 2 to 15 mg/m². When the coating weight falls within this range, sufficient antistatic properties and slip properties can be established and the film suffers from little positioning error when used in, for example, window film application. In recycling, moreover, the transparency and antiblocking properties of the film are not affected thereby.

Now, the third modifier composition will be illustrated. The third modifier composition contains a polyether-modified silicone represented by formula (1) as described above, a polyoxyethylenealkylamine represented by the following formula (2), or a polyoxyethylene polyoxypropylene glycol represented by the following formula (3).

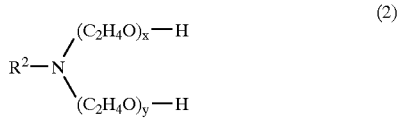
(2)

In formula (2), $R^2$ represents an alkyl group having 8 to 22 carbon atoms; x is an integer of from 1 to 30; and y is an integer of from 1 to 30.

(3)

The compound represented by formula (3) has a molecular weight of from 1,500 to 15,000 and the total weight of the repeating unit d and the repeating unit f amounts to 40 to 95% of the whole molecule.

Different from the first and second modifier compositions, the third modifier composition is free from any inorganic microparticles and thus it is unnecessary to give attention to prevent the fall-out of inorganic microparticles from the film. Furthermore, the third modifier composition is advantageous in that it can be produced economically because of being free from any water soluble polymer.

As described above, there are various types of surfactants. In case where a polyether-modified silicone is employed without adding any water soluble polymer, use is made of the surfactant represented by formula (2). When a polyether-modified silicone is used together with a fatty acid amide as disclosed in JP-A-10-119978, the slip properties and antiblocking effect characteristic to the modified silicone are inhibited. In this case, moreover, the antistatic properties characteristic to the fatty acid amide are also worsened and thus the object of the invention cannot be achieved.

In the third modifier composition, it is unnecessary to further add any water soluble polymer in order to improve the application properties. This is because the polyether-modified silicone is highly compatible with the polyoxyethylenealkylamine and thus the modifier composition can be uniformly applied onto the film base surface without adding any water soluble polymer.

The polyoxyethylenealkylamine of formula (2) disclosed in the invention can be obtained by an addition reaction between an aliphatic amine having 8 to 22 carbon atoms and ethylene oxide, or a dehydration reaction between an aliphatic amine and polyoxyethylene. Among all, it is favorable to use an aliphatic amine having 8 to 18 carbon atoms in view of the antistatic properties and slip properties of the film and the affinity with the polyether-modified silicone. For example, use may be made of saturated aliphatic amines such as laurylamine, myristylamine or autearylamine either alone or as a mixture with unsaturated aliphatic amine(s) such as oleilamine (for example, higher aliphatic amines obtained form coconut oil or beef tallow). It is still preferable to use a polyoxyethylenealkylamine of formula (2) wherein x is an integer of from 1 to 15 and y is an integer of from 1 to 15.

The polyoxyetylene polyoxypropylene glycol of formula (3) disclosed in the invention is a high-molecular weight nonionic surfactant having polyoxyethylene as a hydrophilic group and polyoxypropylene as a hydrophobic group. The hydrophilic/hydrophobic balance can be controlled depending on the values a, b and c in the formula.

In the invention, the content of the repeating units (d+f) amounts to 40 to 95% by weight, preferably 50 to 85% by weight, of the whole molecule from the viewpoints of the antistatic properties, the compatibility with the polyether-modified silicone and the slip properties.

The most suitable composition ratio (a) the polyether-modified silicone to (b) the polyoxyethylenealkylamine or polyoxyethylene polyoxypropylene glycol (i.e., (a):(b)) is 1:0.1 to 9.0. In case where the film is to be used in mechanical processing such as window film application, it is favorable to use the composition ratio as defined below.

Namely, it is favorable that the third modifier composition contains from 85 to 100% by weight of the polyether-modified silicone and form 15 to 90% by weight of the polyoxyethylenealkylamine or polyoxyethylene polyoxypropylene glycol. By controlling the composition ratio to this level, appropriate slip properties, sufficient slip properties and an antiblocking effect (a decrease in peeling force) can be obtained. As a result, the film scarcely suffers from positioning error or winding in the step of, for example, window film application. Moreover, the adhesion of the film to an adherend is not inhibited and the film is free from any decrease in transparency in the course of recycling.

By controlling the content of the polyoxyethylenealkylamine or polyoxyethylene polyoxypropylene glycol to 15% by weight or more, good antistatic properties can be imparted to the film, in particular, under less humid conditions (20° C., relative humidity 20%). As a result, the film scarcely suffers from blocking or positioning error in the step of envelope window film application. By controlling the content thereof to 90% by weight or less, improvement can be made in the friction between film sheets and antiblocking properties and, therefore, the film scarcely winds around each other in envelope window film application. Moreover, it shows an appropriate peeling force between film sheets, which ensures stable unwinding of the film roll.

In an application system wherein either the polyether-modified silicone, the polyoxyethylenealkylamine, or the polyoxyethylene polyoxypropylene glycol is employed alone, it is difficult to satisfy all of the requirements for the antistatic properties, slip properties, antiblocking effect and transparency. By using these components together, the uniform dispersion of the polyether-modified silicone on the film surface can be facilitated and the slip properties and the antistatic properties can be synergistically improved. At the same time, the antiblocking effect can be established.

From the viewpoint of the balance of the properties as described above, it is still preferable that the contents of the polyether-modified silicone and the content of the polyoxyethylenealkylamine or the polyoxyethylene polyoxypropylene glycol are controlled respectively to 40 to 60% by weight and 60 to 40% by weight.

The modifier composition is applied to each surface of the film base in a weight of from 2 to 30 mg/m$^2$, preferably from 2 to 15 mg/m$^2$. When the application dose falls within this range, the antistatic properties are controlled to the adequate level and thus positioning error scarcely arises in bag-forming or window film application. In this case, moreover, the appropriate adhesion properties of the film to paper are ensured and the transparency and antiblocking effect of the film are not adversely affected in the course of recycling.

Next, the total coating weight of the modifier composition according to the invention will be described in detail.

The composition ratio of each modifier disclosed in the invention and the coating weight thereof on the film base surface have been described above. In case where the film according to the invention is to be used in mechanical processing, in particular, envelope window film application, it is recommended that the total coating weights of the modifier compositions onto the film surfaces (A') and (B') are controlled respectively to definite ranges, as will be described hereinbelow.

Although the antistatic properties and anti-clouding properties are improved with an increase in the coating weight of the modifier composition, it is preferable for the following reason that the coating weights are restricted in a film for envelope window. More particularly speaking, it is favorable that the coating weight of the modifier composition onto the film surface (A') ranges from 4.5 mg/m$^2$ to 30 mg/m$^2$ while that the coating weight of the modifier composition onto the film surface (B') ranges from 2.0 mg/m$^2$ to 15 mg/m$^2$.

When the coating weight onto the film surface (A') falls within the range as defined above, sufficient antistatic properties can be established and yet the film shows no stickiness. When the coating weight onto the film surface (B') falls within the range as defined above, sufficient antistatic properties can be established and the adhesion time of the film to paper can be shortened. This is because the problem of the prevention by the modifier composition of the attainment of an adhesive to the film base surfaces can be overcome as described above.

The film according to the invention, which has the constitution as described above, has the following physical properties in case of using any modifier composition, so long as the requirements for the composition ratio and total coating weight as defined above have been satisfied.

Regarding the electrostatic properties on each film surface, the film surface (A') has a half-life (JIS L 1094: measured at 20° C., relative humidity 20%) of 90 seconds or less (still preferably 60 seconds or less), while the film surface (B') has a half-life of 300 seconds or less. When the half-life of the film surface (A') is controlled to this level, papers can be surely enclosed in envelopes and film sheets do not wind around each other in, for example, an automatic paper feeder.

Next, the roughness of the film base surfaces (A) and (B) will be described in detail.

It is recommended in the invention that the center-line average of surface roughness parameter (hereinafter referred to simply as "surface roughness parameter") is regulated within a specific range. The surface roughness parameter is measured by using a surface shape analyzer (SAS-2010 manufactured by Meishin Koki K.K.), extracting the roughness curves on definite lines on the film base surface before the application of the modifier, dividing the area of a part surrounded by a roughness curve of 1 mm in length and the center line with the measurement length (i.e., 1 mm) to thereby determine the average deviation in each of the longitudinal and transverse directions, and then calculating the longitudinal and transverse values.

In a preferred embodiment of the invention, the surface roughness parameter of the film base surface preferably ranges from 0.4 to 2.2 $\mu$m, still preferably from 0.42 to 2.0 $\mu$m.

In the invention, the surface characteristics of the film are improved and slip properties are imparted to the film by applying a modifier composition containing inorganic microparticles having a particle diameter falling within a specific range (i.e., the first modifier composition) to give a coating weight falling within a specific range, or by applying a polyether-modified silicone to give a coating weight falling within the specific range as described above. It has been found out that relatively gentle convexo-concave on the film base surface per se contributes to the effective performance of a high-speed mechanical processing operation.

That is to say, when the surface roughness parameter is 0.4 to 2.2 $\mu$m, the film surface becomes smooth and thus suffers from little frictional scratches during high-speed operation on metal rollers. In this case, favorable slip properties are established too. As a result, the film scarcely undergoes wrinkling or positioning error even on, for example, a vacuum drum sucking the film at a high speed in envelope window film application.

In general, slip properties are evaluated on the basis of coefficient of dynamic friction. However, the measurement at less than 10 m/minute, which is commonly employed in the art, is insufficient in evaluating the slip properties during a high-speed operation in mechanical processing with the use of, for example, a bag-forming machine or a high-speed window film applicator. In the invention, therefore, a coefficient of high-speed dynamic friction ranging from 0.1 to 0.35 (between the film and a metal (specular stainless face) determined at a high speed of 30 m/min) is employed as the reference. It is obvious in the coefficient of high-speed dynamic friction that the coefficient of dynamic friction is elevated when the surface roughness parameter exceeds 2.2 $\mu$m. When the film according to the invention is used in envelope window film application, it is preferable that the coefficient of high-speed dynamic friction of the film falls within the range as defined above. It is still preferable that both surfaces of the film have the coefficients of high-speed dynamic friction falling within this range. When the film is to be used for other purposes, however, this factor is not essentially required.

In the bag-forming machine of the automatic feeding type as described above, for example, a film having a coefficient of high-speed dynamic friction of 0.15 to 0.57 can be used without any troubles.

The surface roughness parameter can be controlled within the range as defined above by appropriately adding a rubber-modified polystyrene resin, which is a styrene resin, to the resin composition. In this case, it is preferable to add about 3 to 24% by weight of the rubber-modified polystyrene resin, though the content varies depending on the diameter of rubber particles contained in the rubber-modified polystyrene resin. Alternatively, the surface roughness parameter can be controlled by adding a component dispersible as particles in the rubber-modified polystyrene resin, for example, aromatic vinyl hydrocarbon/conjugated diene block copolymers or organic or inorganic microparticles other than the styrene resin.

In case of using microparticles, it is preferable to add from about 1% by weight to 10% by weight of the microparticles, though the content varies depending on the diameter and constituting resin of the microparticles.

The microparticle diameter preferably ranges from 0.5 to 10 $\mu$m. When the content of the microparticles falls within the range defined above, the microparticles can be uniformly dispersed all over the film surface to give gentle convexo-concave, thereby achieving a coefficient of dynamic friction at the desired level. When the diameter of the microparticles falls within the range defined above, appropriate convexo-concave can be obtained.

By biaxially stretching such a film composition as described above, the granular components in the film affect the film surface shape and thus contribute to the formation of relatively gentle convexo-concave.

Next, the adhesion time will be illustrated in detail by citing a case of applying the film to an envelope window by way of example. (The method for measuring the adhesion time employed herein will be described in detail hereinafter.) In a window film applicator, a film is adhered to an envelope paper almost simultaneously with the application of an adhesive to the film. The adhesion is carried out by putting the film on a metal cylinder under high-speed rotation, feeding the envelope paper along the tangent line of the cylinder, and thus bringing the film into contact with the envelope paper. At the point of the contact of the film with the envelope paper, adhesion is performed under a shear force in the tangent direction of the cylinder. Accordingly, it is highly important in high-speed window film application to quicken the attainment of the adhesive to the base surface and the solidification thereon, thereby preventing positioning error between the film and the window frame.

Although an aqueous emulsion type adhesive can be quickly absorbed by the envelope paper and fixed thereon, it takes a somewhat long time (i.e., the adhesion time) that the adhesive attains the film base surface because of the antistatic agent present on the film surface. It is preferable that the adhesion time of the film base surface to the paper is not longer than 30 seconds. When the adhesion time falls within this range, the adhesive can sufficiently quickly attain the film base surface and thus positioning error scarcely arises between the film and the window frame and the commercial value of the envelope is not worsened. It is still preferable that the adhesion time is not longer than 25 seconds, still preferably not longer than 20 seconds. It is also preferable that the difference between the adhesion time of the film surface (A') carrying the composition applied thereon to the paper and the adhesion time of the opposite film surface (B') to the paper is 1.0 second or longer and the adhesion time of the film surface (B') to the paper is not longer than 30 seconds.

Now, the production process according to the invention will be described in detail.

A styrene resin, which optionally contains publicly known additives (for example, a heat stabilizer, an antioxidant, a plasticizer), is molten and kneaded in an extruder and then stretched by the tentering method or the inflation method to give a film of a definite thickness.

In case of using the tentering method, either simultaneous biaxial stretching or successive biaxial stretching may be selected. It is desirable that the stretching is carried out at a temperature higher, by from 20° C. to 40° C., than the Vicat softening point of the styrene resin.

When stretched at a temperature lower than the lower limit as defined above (i.e., the Vicat softening point+20° C.), the obtained film has a high rigidity. As a result, the film sheet can be hardly fed into a guide roll in a bag-forming machine of automatic filling type, which causes sealing failure. In the step of window film application, the film cannot follow up the envelop paper and thus causes positioning error. When the stretching temperature exceeds the upper level (i.e., the Vicat softening point+40° C.), the obtained film becomes less stiff. As a result, the film cannot follow up the guide roll in a bag-forming machine of automatic filling type, which causes sealing failure. In this case, the film suffers from wrinkling in the course of the window film application.

In the stretching temperature range as defined above, the percent of stretch is adjusted to 2 to 17 both in the longitudinal and transverse directions. In order to enhance the film strength by imparting orientation properties and achieve uniform stretching, it is still preferable that the percent of stretch is adjusted to from 4 to 12. It is also desirable that the stretch ratio (longitudinal percent of stretch/transverse percent of stretch) falls within a range of from 1 to 1.3.

In the inflation method, the film is stretched 2- to 17-fold while controlling the temperature in the bubble chamber so that the stretching is started at a temperature higher, by from 30° C. to 90° C., than the Vicat softening point, while the bubble center temperature is adjusted to a point higher, by from 20° C. to 60° C., than the Vicat softening point. In order to enhance the film strength by imparting orientation properties and achieve uniform stretching, it is still preferable that the percent of stretch is adjusted to from 4 to 12.

The thickness of the film having been stretched according to the invention is not particularly restricted. To use in food packaging, the film thickness ranges from 10 to 60 $\mu$m, preferably from 15 to 50 $\mu$m. A film having a thickness less than 10 $\mu$m has only an insufficient strength and therefore is liable to be broken when a food is wrapped therein. On the other hand, a film having a thickness exceeding 60 $\mu$m shows an excessively high rigidity and frequently causes sealing failure. To use in envelope window film application, it is preferable that the film thickness is from 15 $\mu$m to 50 $\mu$m. A film having a thickness less than 15 $\mu$m sometimes suffers from wrinkling in the course of window film application due to the small thickness and low rigidity. When the film thickness exceeds 50 $\mu$m, there sometimes arises positioning error between the film and the envelope in the course of the window film application because of the relatively high film rigidity. It is still preferable that the film thickness ranges from 20 $\mu$m to 40 $\mu$m.

One face of the base film, which has been stretched into a definite thickness as described above, is subjected to a hydrophilic treatment.

The hydrophilic treatment may be carried out by using a publicly known method such as the chemical method with the use of conc. sulfuric acid or conc. nitric acid or the corona discharge method. It is suitable in the invention to use the corona discharge whereby both surfaces can be continuously treated one by one at a high speed. In the hydrophilic treatment, the concentration of conc. sulfuric acid or conc. nitric acid or the output of corona discharge is controlled so as to give the definite ratio of the surface tension of the film base surfaces (A) to the surface tension of the other film base surface (B). In case of using the chemical method, surface tension of 480 $\mu$N/cm or 610 $\mu$N/cm can be obtained by, for example, immersing the base film in nitric acid (purity: 96%) heated to 30° C. respectively for 10 seconds or 60 seconds. In case of using the corona discharge method, the desired surface tensions can be obtained by using a four-crest electrode, adjusting the distance between the base film and the electrode to 1 mm and then subjecting the film base surface (A) and the film base surface (B) to the corona discharge respectively at 4 W/m$^2$/min and 2 W/m$^2$/min.

Next, the modifier composition dissolved in a solvent (for example, water, isopropyl alcohol) is applied by a publicly known method by using, for example, a roll coater, a spray coater or an air knife coater. After drying the solvent, the opposite surface, which has been coated with the modifier composition, is subjected to the hydrophilic treatment and then the film is wound into a roll. Alternatively, both surfaces of the film base may be preliminarily subjected to the hydrophilic treatment. It is favorable that the solvent is dried with a hot air stream of 70° C. to 140° C.

In the step of winding into a roll, the winding tension is preferably adjusted to 2 kg·m to 10 kg·m as in common cases. By winding into a roll, the film base surface (A) comes into contact with the film base surface (B) and thus the modifier composition applied on the film base surface (A) transfers onto the film base surface (B) (i.e., back transfer). When the film roll is unwound and used, the coated film surfaces (A') and (B') can be thus presented. The face pressure to be applied to the roll preferably ranges from 0.05 to 100 kg/cm². After storing at ordinary temperature for 4 hours or longer, the modifier composition can be transferred onto the base surface (B) at a desired ratio before using.

So long as the face pressure is maintained within the range as defined above, any troubles (for example, buckling) scarcely arise in any roll shape or winding tension ensuring the uniform transfer.

More particularly speaking, the film coated with the modifier composition is wound into a roll and stored for a definite period of time. Then, it is slit into pieces having appropriate width and length depending on the purpose followed by reverse rolling. Then the thus reverse-rolled film is stored for a definite period of time before using. That is to say, transfer is performed onto the innermost layer of the coated film roll under appropriate winding pressure. In the subsequent step of reverse rolling, the outermost layer in the previous step serves as the innermost layer and thus transfer is performed onto this face similarly.

Next, the invention will be described in greater detail by reference to the following Examples and Comparative Examples.

First, evaluation methods employed in Examples and Comparative Examples will be illustrated.

(1) Evaluation of Surface Tension

Surface tension was determined in accordance with ASTM D 2578.

After washing away the modifier applied on the film surface with, for example, pure water or isopropyl alcohol, the film surface was sufficiently washed with pure water and dried followed by the determination of surface tension in accordance with ASTM D 2578.

(2) Measurement of the Coating Weight of Modifier Composition

A styrene resin film wound into a roll was stored at 25° C. under relative humidity of 60% for 2 weeks. Then the roll was unwound and the amount of the modifier composition applied on the thus obtained film was measured.

The coating weight was determined by extracting the modifier composition applied on one face (about 0.5 m²) of the film for evaluation with isopropyl alcohol, weighing the extraction residue and then calculating the weight of the modifier composition applied per unit film area (mg/m²).

(3) Evaluation of Half-life

The half-life of the film surface for evaluation as described in (2) was determined in accordance with JIS L 1094 (20° C., relative humidity 20%). The measurement was performed by using a static honestmeter (Model H-0110, manufactured by Shishido Denki K.K.) at an applied voltage of 10 kV while adjusting the electrode-sample distance to 20 mm.

(4) Evaluation of Adhesion Time Between Film to Envelope Paper

Adhesion time was measured by the following procedure.

(i) A styrene resin film was cut into a piece (20 mm in width, 50 mm in length) and fixed to a glass plate of an automatic bench coating apparatus with scotch tape.

(ii) An envelope paper was cut into a piece (30 mm in width, 100 mm in length) and one lengthwise end of the piece was put together with the styrene resin film of the above (i).

(iii) The styrene resin film was laid over the envelope paper. Then 3 g of an adhesive was inserted between the styrene resin film and the envelope paper at one end of the overlapped faces. Then a Mayerbar weighing 70 g was immediately operated so that the styrene resin film was brought into contact with the envelope paper via the adhesive.

(iv) After the completion of the contact, the styrene resin film and the envelope paper were allowed to stand for 1 seconds and then the paper was horizontally pulled at 200 gf.

(v) In case where the envelope paper was not out of position when pulled, the styrene resin film and the envelope paper were evaluated as "adhered". The operation of allowing to stand for 1 second and then pulling was repeated until the film and paper attained the "adhered" state. The cumulative standing time until the attainment of the "adhered" state was referred to as the adhesion time.

(vi) As the envelope paper, a commonly employed kraft paper (basis weight: 75.5 g) manufactured by Oji Paper Co., Ltd. was used. As the adhesive, an aqueous emulsion adhesive containing an ethylene/vinyl acetate copolymer as the main component (Saivinoru FB-408, manufactured by Saiden Kagaku K.K.) was used. Samples showing the adhesion times on the film surface (B') of 20 seconds or less, 21 to 30 seconds, and exceeding 30 seconds were evaluated respectively as ⊚, ○ and X.

(5) Evaluation With Window Film Applicator

Using a window film applicator (Model HELIOS 202 manufactured by WINKLER+DUNNEBIER), styrene resin film pieces (54 mm in width, 94 mm in length) were applied to envelopes provided with an opening (50×90 mm) at a rate of 1,300 sheet/min to give 21,000 envelopes having window. The obtained envelopes having window were evaluated in the following items.

(a) Evaluation of Positioning Error

In the 21,000 envelopes having film-coated window obtained above, 50 samples were picked up at random from among the 1st to 100th envelopes, 50 samples were picked up at random from among the 900th to 1,000th envelopes, 50 samples were picked up at random from among the 1,900th to 2,000th envelopes, . . . 50 samples were picked up at random from among 19,000th to 20,000th envelopes, thereby selecting 1,000 samples in total. Samples showing positioning shifts of less than 0.5 mm, from 0.5 to 1.0 mm, and more than 1.0 mm were respectively scored 1, 0.5 and 0. Then the total scores of bundles each having 50 samples were calculated and bundles showing total scores of 50, from 48.8 to 49.5, from 46.5 to 48.0, and less than 46 were evaluated respectively ⊚, ○, Δ and X.

(b) Evaluation of Winding Among Film Sheets

In the course of the window film application on 20,000 envelope, the number of times film sheets wound around each other were counted. Samples with the winding numbers of 0, 1, 2 and 3 or more were evaluated respectively as ⊚, ○, Δ and X.

(c) Evaluation of Wrinkling 100 envelopes were selected at random from among 1,000 envelopes provided with film-coated window. When none of the 100 envelopes suffered from wrinkling, the samples were evaluated as ⊚. When 5 or less envelopes showed some wrinkling, the samples were evaluated as ○. When wrinkling was observed at a somewhat severer evaluated as Δ. When wrinkling arose seriously or highly frequently and thus cause problem in using the envelope in practice, the samples were evaluated as X.

(d) Scratch Resistance

Immediately before the completion of the window film application, 10 envelopes were selected at random from among 1,000 ones. Then the haze value (the average of the haze values in both faces of 10 envelopes) was measured to determine the rise in the haze value based on the haze value of the film before application to window (which had been determined by cutting out 30 film pieces for the haze value measurement at arbitrary parts of the film (20 m) before feeding into the window film applicator, measuring the haze values of groups each having 10 pieces, and then calculating the average of these 3 haze values). Samples showing rises of less than 1%, from 1 to 1.5%, from 1.5 to 2.5% and 2.5% or more were respectively evaluated as ⊚, ○, Δ and X.

The haze value was measured in accordance with ASTM D-1003.

(6) Center Line Average of Surface Roughness Parameter

By using a surface shape analyzer (SAS-2010 manufactured by Meishin Koki K.K.), roughness curves on definite lines on the film base surface were extracted. Then the area of a part surrounded by a roughness curve of 1 mm in length and the center line was divided with the measurement length (i.e., 1 mm) at 3 arbitrary parts each in the longitudinal and transverse directions to thereby determine the average deviation. Namely, the average of each of the longitudinal and transverse directions was obtained. The calculation was made to the second decimal place as significant figures.

(7) Coefficient of High-speed Dynamic Friction Between Film and Metal

Coefficient of high-speed dynamic friction was measured by using a coefficient of high-speed friction measurement apparatus (Model AB-410, manufactured by Tester Sangyo K.K.) on a specular stainless rider at 30 m/minute. The measurement was made to the second decimal place as significant figures.

(8) Transparency

A styrene resin film having the modifier composition applied thereon was finely ground, molten at 200° C., and extruded to give chips. The obtained chips were molten at 200° C. for 1 minute with a hot-press and cooled to give a resin plate of 3 mm in thickness. Then the haze value of the plate was measured in accordance with ASTM-D1003. Using as a standard the haze value of a resin plate obtained form a styrene resin film having no modifier composition, the transparency was evaluated in the following 4 grades based on the difference in haze values.

⊚: difference from standard haze value≦1.0% (good transparency).

○: 1.0%<difference from standard haze value≦2.0% (somewhat good transparency).

Δ: 2.0%<difference from standard haze value≦3.0% (somewhat poor transparency).

X: difference from standard haze value>3.0% (poor transparency).

(9) Antiblocking Properties

Film samples (width: 70 mm) were overlapped together and maintained under a load of 50 kg/cm$^2$ at 50° C. under a relative humidity of 85% for 15 hours. Then the load at peeling the contact faces was measured and thus the antiblocking properties were evaluated according to the following criteria.

⊚: peeling load≦10 g (good antiblocking properties).

○: 10 g<peeling load≦15 g (somewhat good antiblocking properties).

Δ: 15 g<peeling load≦30 g (somewhat poor antiblocking properties).

X: peeling load>30 g (poor antiblocking properties).

(10) Vicat Softening Point

Determined in accordance with ASTM D 1525.

(11) Evaluation by Using Automatic Filling/packaging Machine

A laminate film composed of a styrene resin film and EVA was produced in accordance with the method of JP-A-8-230933. By using a high-speed horizontal monoaxial pillow packaging machine (Super Wrapper Model S-5000JBX, manufactured by Omori Kikai Kogyo K.K.), the film was processed into bags (150 mm in width, 60 mm in height, 250 mm in length) at a speed of 100 bags/minutes while automatically filling raw shiitake (100 g/bag) therein.

The shear between film ends was evaluated at the sealing part in the lengthwise (250 mm) direction of each bag and samples showing shears of 0.2 mm or less, 0.2 to 0.4 mm, 0.4 to 0.6 mm and exceeding 0.6 mm were evaluated respectively as ⊚, ○, Δ and X.

EXAMPLE 1 AND COMPARATIVE EXAMPLE 1

As the styrene resin film according to the invention, use was made of the styrene resin film of the resin composition P2 shown in Table 1. The resin composition was fed into a monoaxial (diameter: 40 mm) vent-type extruder and melt-kneaded at 186° C. Then the molten mixture was extruded from a T-die in the form of a sheet and the sheet was brought into contact with a cooling roll. Next, it was introduced onto heating rolls and roll-stretched 4-fold in the flow direction at 121° C. Subsequently, the sheet was fed into a tenter while keeping the temperature as described above and stretched transversally at a stretching temperature of 121° C. to give a styrene resin film of 30 μm in thickness.

This film base per se had a surface tension of 330 μN/cm on both surfaces.

This film base was subjected to corona discharge on both surfaces to give the surface tensions as listed in Table 6. The corona discharge was carried out by using Model AGI-060MD (manufactured by Kasuga Denki K.K.) at an output of 1 to 12 W/m$^2$/minute from a four-crest electrode. In case of treating at an output of 2 W/m$^2$/minute while adjusting the distance form the film 1 mm, for example, the surface tension of the film base surface became 400 μN/cm. In case of treating at an output of 4.2 W/m²/minute while adjusting the distance form the film 1 mm, the surface tension of the film base surface became 500 μN/cm.

After achieving the definite surface tensions on the film surfaces, modifier components (the first combination), namely, the surfactant as listed in Table 2, the water soluble polymer as listed in Table 3 and the inorganic microparticles as listed in Table 4 were weighed in accordance with each coating weight and poured into a stainless container (400 l). Then these components were diluted 50- to 200-fold by supplying water thereto while mixing with a three-blade stirrer to give the modifier composition. The modifier composition was applied in the definite weight onto the film surface (A) alone with an air knife coater and then dried with a hot air stream at 90° C. Next, the film was wound into a roll at a winding tension of 8.5 kg·m.

As Table 6 clearly shows, the adhesion weights of the modifier composition onto the both surfaces of the film base could be controlled each within an appropriate range, so long as the surface tensions and surface tension ratio fell within the ranges as specified in the invention. On the other hand, an excessively high surface tension resulted in poor antiblocking properties, as shown by Experimental No. 1 of Comparative Example 1. In case where the surface ratio was out of the range as defined in the invention as in Experimental Nos. 2 and 3 of Comparative Example 1, the adhesion weight varied from measurement site to measurement site of the film and thus the coating weight could not be controlled.

Next, the obtained films were set on a window film applicator and window envelopes were produced. Table 7 shows the evaluation data on the positioning error of the obtained envelopes and winding of the film sheets. The samples of Example 1 were all evaluated as excellent, while the samples of Experimental Nos. 2 and 3 of Comparative Example 1 showed serious scatters in the modifier composition coating weight and suffered from positioning errors and winding at some selection sites.

EXAMPLE A AND REFERENTIAL EXAMPLE A

The same base film as Example 1 was subjected to a hydrophilic treatment by corona discharge so as to give a surface tension on the front surface (A) of 550 μN/cm and a surface tension on the back surface (B) of 450 μN/cm. Next, the same modifier as Example 1 was applied by the same method. The modifier contained the components a-1, b-1 and c-1 respectively in amounts of 78.1% by weight, 15.6% by weight and 6.3% by weight and the total coating weights as specified in Table 8 were achieved by controlling the dilution ratio with water. Then the obtained film was dried and wound into a roll.

The film rolls thus obtained were subjected to bag-formation with an automatic feeding machine and window film application with a window film applicator. As a result, all of these films could be processed into bags with the automatic feeding machine without causing any troubles. In the window film application, the films of Example A showed each excellent performance. However, the films of Experimental Nos. 1 and 2 of Referential Example 1 underwent winding due to the small coating weights, while the film of Experimental No. 3 suffered from problems in adhesion time and positioning error due to the excessively large total coating weight.

EXAMPLE 2 AND COMPARATIVE EXAMPLE 2

The same base film as Example 1 was used. The modifier components as listed in Tables 2, 3 and 5 were combined as in Table 9 and applied to the film so that films having the second modifier compositions applied thereon were obtained as in Example 1. Table 9 summarizes the results.

As in Example 2, excellent results could be obtained by using the second modifier composition, so long as the surface tensions and surface tension ratio fell within the ranges as specified in the invention. On the other hand, an excessively high surface tension resulted in poor antiblocking properties in Experimental No. 1 of Comparative Example 2. In the films of Experimental Nos. 2 and 3 of Comparative Example 2, on the other hand, the adhesion weight varied widely and thus the coating weight could not be controlled, which made these films impractical.

EXAMPLE 3 AND COMPARATIVE EXAMPLE 3

The same base film as Example 1 was used. The modifier components as listed in Tables 2, 3 and 5 were combined as in Table 10 and applied to the film so that films having the second modifier compositions applied thereon were obtained as in Example 1. Table 10 summarizes the results.

As in Example 3, excellent results could be obtained by using the third modifier composition, so long as the surface tensions and surface tension ratio fell within the ranges as specified in the invention. On the other hand, an excessively high surface tension resulted in poor antiblocking properties in Experimental No. 1 of Comparative Example 3. In the films of Experimental Nos. 2 and 3 of Comparative Example 2, on the other hand, the adhesion weight varied widely and thus the coating weight could not be controlled, which made these films impractical.

EXAMPLE 4, COMPARATIVE EXAMPLE 4 AND REFERENTIAL EXAMPLE

By using a film of the resin composition as given in Table 1 as the film base, a 30 μm film was obtained by extruding the resin from a circular slit die of a monoaxial (diameter: 40 mm) vent-type extruder and stretching 5.5-fold in the longitudinal direction and 6.0-fold in the transverse direction while controlling the temperature in the bubble chamber so as to give a temperature at the bubble center of 117 to 122° C.

The obtained film was subjected to the same hydrophilic surface treatment as Example 1. Namely, one surface was subjected to the corona discharge at a distance from the film of 1 mm and an output of 5.3 W/m²/minute while the opposite surface was treated at a distance form the film of 1 mm and an output of 3.3 W/m²/minute to thereby respectively give surface tensions of 550 and 450 μN/cm. Surface tensions disclosed herein were determined at a distance between the electrode and the film under the following corona discharge intensity.

1. 350 μN/cm at 8 W/m²/min.
2. 400 μN/cm at 0 W/m²/min.
3. 450 μN/cm at 3 W/m²/min.
3. 460 μN/cm at 5 W/m²/min.
4. 500 μN/cm at 2 W/M²/min.
4. 520 μN/cm at 7 W/m²/min.
5. 550 μN/cm at 3 W/m²/min.
6. 610 μN/cm at 8 W/m²/min.

The modifier compositions listed in Table 11 were each applied to the surface of a base having a surface tension of 550 μN/cm and the film was dried and wound into a roll as in Example 1.

These film rolls were evaluated with the use of a window film applicator. Tables 11, 12 and 13 show the results.

As Tables 11 and 12 show, the film rolls prepared by using the first modifier composition and controlling the surface roughness and coating weights each within the range as defined in the invention achieved excellent results in all of the evaluation items with the use of the window film applicator and the automatic filling machine.

On the other hand, the sample of Experimental No. 1 of Comparative Example 4 which contained no surfactant as an antistatic agent showed a half-life exceeding 300 seconds and failed to attain a practically usable level in the evaluation with the window film applicator. Similarly, the sample of Experimental No. 2 of Comparative Example 4 which contained no inorganic microparticles as an external slip agent failed to attain a practically usable level due to the excessively high coefficient of high-speed dynamic friction.

The evaluation data of the samples of Experimental Nos. 1 and 2 of Referential Example indicate that the samples containing no water soluble polymer, as in Referential Example 4, are unsuitable for window film application but sufficiently usable in, for example, food packaging since they showed no shear in bag-forming.

In the samples of Experimental Nos. 10 to 12 of Example 4 for examining surface roughness, the sample of Experimental No. 10 had a surface roughness lower than the lower limit for window film application, while the samples of Experimental Nos. 11 and 12 had each a surface roughness exceeding the upper limit. Therefore, these samples failed to achieve satisfactory results in the evaluation with the use of the window film applicator, though these samples were sufficiently usable in practice as food packaging films.

In the samples of Experimental Nos. 13 to 17 of Example 4 for examining coefficient of high-speed dynamic friction, these samples had each a coefficient of high-speed dynamic friction exceeding the upper limit (i.e., 0.35) preferable in window film application and, therefore, failed to achieve satisfactory results in the evaluation with the use of the window film applicator, though these samples were sufficiently usable in practice as food packaging films.

EXAMPLE 5 AND COMPARATIVE EXAMPLE 5

By using the resin composition P2 in Table 1 as the film base, a base film of 30 μm in thickness was obtained by the same inflation method as described in Example 4. The obtained film was surface-treated, coated and dried as in Example 4.

The second modifier compositions shown in Tables 14 and 15 were applied to the film base as described above and the films thus obtained were evaluated with the use of a window film applicator. Tables 14 and 15 show the results.

As Table 14 shows, the films of Example 5, each having the second modifier composition applied at coating weights falling within the range defined in the invention, showed excellent results both in the window film application and the food packaging.

On the other hand, the sample of Experimental No. 1 of Referential Example 5 (Table 15) containing no water soluble polymer failed to achieve satisfactory results in the evaluation with the window film applicator, though it was sufficiently usable in practice as a food packaging film.

A film containing no surfactant (for example, the sample of Comparative Example 1) was poor in the antistatic properties and thus impractical. Similarly, a film containing no polyether-modified silicone was poor in the slip properties and thus impractical both in the window film application and the food packaging.

EXAMPLE 6 AND COMPARATIVE EXAMPLE 6

By using the resin composition P2 in Table 1 as the film base, a base film of 30 μm in thickness was obtained by the same inflation method as described in Example 4. The obtained film was surface-treated, coated and dried as in Example 4.

The third modifier composition shown in Tables 16 and 17 were applied to the film base as described above and the films thus obtained were evaluated with the use of a window film applicator. Tables 16 and 17 show the results.

As Example 6 shows, the films with the use of the third modifier compositions containing the surfactants a-2, a-5 and a-7, each having antistatic properties, showed excellent evaluation results both as the window films and the food packaging films.

On the other hand, the films containing no surfactant (for example, the sample of Experimental No. 1 of Comparative Example 6) were poor in the antistatic properties and thus impractical. Although the content of the polyether-modified silicone was increased, compared with the sample of Experimental No. 1, in the samples of Experimental Nos. 2 and 3 of Comparative Example 6, the antistatic properties were still insufficient and the films were worsened in transparency, which made these films impractical. In the films of Experimental Nos. 7 and 8 of Comparative Example 6, the surfactants a-1, a-3 and a-4 were employed. Since these surfactants could not achieve sufficient antistatic properties when blended with the polyether-modified silicone, these films were impractical. In the film of Experimental No. 9 of Comparative Example 6, a surfactant having insufficient antistatic properties when blended with the polyether-modified silicone was used in a large amount. Although the film showed somewhat antistatic properties, its slip properties were extremely worsened and thus this film was impractical.

INDUSTRIAL APPLICABILITY

In the styrene resin films according to the invention, the surface tensions on both film base surfaces and the coating weights of a modifier composition are each controlled within a specific range. Owing to this constitution, it becomes possible to provide styrene resin films which can shorten the adhesion time between the film and envelope paper and relieve positioning error between the film and the window frame in high-speed window film application under high-speed film running (i.e., 600 sheet/minute or more).

TABLE 1

| | Composition ratio (wt. %) of resin and additive | | | | |
|---|---|---|---|---|---|
| Resin composition No. | GPPS | HIPS | Hydrogenated SB | Crosslinked PS particles | Vicat softening point (° C.) |
| P1 | 98 | 2 | — | — | 106 |
| P2 | 97 | 3 | — | — | 106 |
| P3 | 95 | 5 | — | — | 105 |
| P4 | 90 | 10 | — | — | 105 |
| P5 | 76 | 22 | — | — | 103 |
| P6 | 75 | 25 | — | — | 103 |
| P7 | 90 | 5 | 5 | — | 105 |
| P8 | 95 | 2 | — | 3 | 106 |
| P9 | 86 | 2 | — | 12 | 106 |

Abbreviations in Table 1:
GPPS: general-purpose polystyrene (weight-average molecular weight: 280,000) Vicat softening point: 106° C.
HIPS: high-impact polystyrene, Vicat softening point: 94° C. (rubbery matter concentration: 6% by weight, average rubber particle diameter: 3 μm).

TABLE 1-continued

| | Composition ratio (wt. %) of resin and additive | | | | |
|---|---|---|---|---|---|
| Resin composition No. | GPPS | HIPS | Hydrogenated SB | Crosslinked PS particles | Vicat softening point (° C.) |

Hydrogenated SB: hydrogenated styrene-butadiene copolymer (butadiene content: 80% by weight).
Crosslinked PS particles: crosslinked polystyrene microparticles (average diameter: 5 μm).

TABLE 2

| Surfactant No. | | Form at 20° C. |
|---|---|---|
| a-1 | Fatty (coconut oil) acid diethanolamide (Starhome F mfd. By Nippon Oils & Fats Co., Ltd.) | Liquid |
| a-2 | Polyoxyethylene alkyl (coconut oil) amine (Naimine F-215 mfd. by Nippon Oils & Fats CO., Ltd.) | Liquid |
| a-3 | Lauric acid diethanolamide (Starhome DL mfd. by Nippon Oils & Fats Co., Ltd.) | Solid |
| a-4 | Polyoxyethylene sorbitan monolaurate (Rheodol TW-L120, mfd. by Kao Corporation) | Liquid |
| a-5 | Polyoxyethylene alkyl (beef tallow) amine (Naimine T2-230 mfd. by Nippon Oils & Fats CO., Ltd.) | Solid |
| a-6 | Hydroxyethyllaurylamine (Naimine L-201 mfd. by Nippon Oils & Fats CO., Ltd.) | Liquid |
| a-7 | Polyoxyethylene polyoxypropylene glycol ether (Epan 485 mfd. by Dai-ichi Kogyo Seiyaku Co., Ltd.) | Solid |

TABLE 3

| Water soluble polymer No. | Water soluble polymer type |
|---|---|
| b-1 | Polyvinyl alcohol |
| b-2 | Polyvinylpyrrolidone |
| b-3 | Sodium polyacrylate |

TABLE 4

| Inorganic microparticle No. | Inorganic microparticle type | Inner surface area | Average particle diameter (μm) |
|---|---|---|---|
| c-1 | Silicone dioxide microparticles | Present | 0.9 |
| c-2 | Silicone dioxide microparticles | Present | 1.4 |
| c-3 | Silicone dioxide microparticles | Present | 12.0 |
| c-4 | Synthetic zeolite microparticles | Present | 4.5 |
| c-5 | Crosslinked styrene | Absent | 2.5 |

TABLE 5

| Polyether-modified silicone No. | Water soluble polymer type | Viscosity (25° C.) cSt |
|---|---|---|
| d-1 | TSF-4441 mfd. by Toshiba Silicone | 250 |
| d-2 | TSF-4440 mfd. by Toshiba Silicone | 180 |
| d-3 | KF-351 mfd. by Shin-Etsu Chemical Co., Ltd. | 100 |

TABLE 6

| | Experimental No. | Surface tension (μN/m) | Modifier No. | Modifier weight (mg/m$^2$) | Modifier coating weight (mg/m$^2$) | Half-life (sec) | Coefficient of high-speed dynamic friction | Antiblocking properties |
|---|---|---|---|---|---|---|---|---|
| Ex. 1 | 1 | 550 | a-1 | 10 | | | | |
| | | | b-1 | 2.0 | 7.6 | 35 | 0.24 | ⊙ |
| | | | c-1 | 0.8 | | | | |
| | | 450 | No application | | 4.6 | 48 | 0.28 | |
| | 2 | 550 | a-1 | 10 | | | | |
| | | | b-1 | 2.0 | 9.2 | 28 | 0.22 | ⊙ |
| | | | c-1 | 0.8 | | | | |
| | | 350 | No application | | 2.8 | 88 | 0.31 | |
| | 3 | 460 | a-1 | 10 | | | | |
| | | | b-1 | 2.0 | 6.7 | 53 | 0.27 | ⊙ |
| | | | c-1 | 0.8 | | | | |
| | | 400 | No application | | 5.2 | 40 | 0.25 | |
| Com. Ex. 1 | 1 | 610 | a-1 | 10 | — | — | — | |
| | | | b-1 | 2.0 | | | | X |
| | | | c-1 | 0.8 | | | | |
| | | Untreated | No application | | | | | |
| | 2 | 400 | a-1 | 10 | 2.2–10.8 | — | — | — |
| | | | b-1 | 2.0 | | | | |
| | | | c-1 | 0.8 | | | | |
| | | 400 | No application | | 1.8–10.3 | — | — | — |
| | 3 | 520 | a-1 | 10 | 1.6–10.0 | — | — | — |
| | | | b-1 | 2.0 | | | | |
| | | | c-1 | 0.8 | | | | |
| | | 460 | No application | | 2.6–10.0 | — | — | — |

In the above Table, the upper and lower columns of each Experimental No. show respectively the front face (A) and the back face (B).

TABLE 7

| Sampling site No. | Ex. 1 Experimental No. 1 Position-ing error | Ex. 1 Experimental No. 1 Winding | Ex. 1 Experimental No. 2 Position-ing error | Ex. 1 Experimental No. 2 Winding | Ex. 1 Experimental No. 3 Position-ing error | Ex. 1 Experimental No. 3 Winding | Comp. Ex. 1 Experimental No. 2 Position-ing error | Comp. Ex. 1 Experimental No. 2 Winding | Comp. Ex. 1 Experimental No. 3 Position-ing error | Comp. Ex. 1 Experimental No. 3 Winding |
|---|---|---|---|---|---|---|---|---|---|---|
| 1 | | | | | | | | | | |
| 2 | | | | | | | | | | |
| 3 | | | | | | | | | | |
| 4 | | | | | | | ⊙ | | | |
| 5 | | | | | | | | | | |
| 6 | | | | | | | | | | |
| 7 | | | | | | | | ⊙ | ⊙ | |
| 8 | | | | | | | | | | ⊙ |
| 9 | | | | | | | ⊙ | | | |
| 10 | ⊙ | ⊙ | ⊙ | ⊙ | ⊙ | ⊙ | ○ | | | |
| 11 | | | | | | | ○ | | ⊙ | |
| 12 | | | | | | | ○ | | ○ | |
| 13 | | | | | | | ⊙ | | ⊙ | |
| 14 | | | | | | | ○ | | ○ | |
| 15 | | | | | | | ○ | ⊙ | ○ | |
| 16 | | | | | | | ○ | ○ | ○ | |
| 17 | | | | | | | Δ | ○ | Δ | ⊙ |
| 18 | | | | | | | Δ | ○ | Δ | ○ |
| 19 | | | | | | | X | X | X | X |
| 20 | | | | | | | Δ | ○ | Δ | ○ |

Sampling site:
From the 1st to the 100th sample sheets were referred to as the sampling site No. 1 while from the 19,000th to the 20,000th sample sheets were referred to as the sampling site No. 20.
The item positioning error shows the results of the evaluation of positioning errors, while the item winding shows the results of the evaluation of the winding of film sheets each other.

TABLE 8

| | Experimental No. | Coating weight Upper: film face (A') Lower: film face (B') | Evaluation of winding among film sheets | Adhesion time | Positioning error | Shear in bag-forming in automatic filling machine |
|---|---|---|---|---|---|---|
| Ex. A | 1 | 7.6 / 4.6 | ⊙ | ⊙ | ⊙ | ⊙ |
| | 2 | 14.6 / 8.7 | ⊙ | ○ | ○ | ⊙ |
| | 3 | 4.6 / 2.5 | ⊙ | ⊙ | ⊙ | ⊙ |
| Ref. Ex. A | 1 | 2.5 / 1.5 | X | ⊙ | ⊙ | ○ |
| | 2 | 3.8 / 2.2 | X | ⊙ | ⊙ | ○ |
| | 3 | 28.5 / 17.0 | ⊙ | X | X | ⊙ |

TABLE 9

| | Experimental No. | Surface tension (μN/m) | Modifier No. | Modifier weight (mg/m²) | Modifier coating weight (mg/m²) | Half-life (sec) | Coefficient of high-speed dynamic friction | Antiblocking properties |
|---|---|---|---|---|---|---|---|---|
| Ex. 2 | 1 | 550 | a-1 | 10 | | | | |
| | | | b-1 | 2 | 7.4 | 36 | 0.26 | ⊙ |
| | | | d-1 | 5 | | | | |
| | | 450 | No application | | 4.4 | 49 | 0.27 | |
| | 2 | 550 | a-1 | 10 | | | | |

TABLE 9-continued

| Experimental No. | | Surface tension (μN/m) | Modifier No. | Modifier weight (mg/m²) | Modifier coating weight (mg/m²) | Half-life (sec) | Coefficient of high-speed dynamic friction | Antiblocking properties |
|---|---|---|---|---|---|---|---|---|
| | | | b-1 | 2.0 | 9.0 | 29 | 0.22 | ⊙ |
| | | | d-1 | 0.8 | | | | |
| | | 350 | No application | | 2.7 | 89 | 0.32 | |
| | 3 | 460 | a-1 | 10 | | | | |
| | | | b-1 | 2 | 6.3 | 48 | 0.25 | ⊙ |
| | | | d-1 | 5 | | | | |
| | | 400 | No application | | 5.0 | 42 | 0.25 | |
| Com. Ex. 2 | 1 | 610 | a-1 | 10 | — | — | — | |
| | | | b-1 | 2 | | | | X |
| | | | d-1 | 5 | | | | |
| | | Untreated | No application | | | | | |
| | 2 | 400 | a-1 | 10 | 2.0–9.3 | — | — | — |
| | | | b-1 | 2 | | | | |
| | | | d-1 | 5 | | | | |
| | | 400 | No application | | 2.0–9.3 | — | — | — |
| | 3 | 520 | a-1 | 10 | 1.1–8.4 | — | — | — |
| | | | b-1 | 2 | | | | |
| | | | d-1 | 5 | | | | |
| | | 460 | No application | | 2.6–8.8 | — | — | — |

In the above Table, the upper and lower columns of each Experimental No. show respectively the front face (A) and the back face (B).

TABLE 10

| Experimental No. | | Surface tension (μN/m) | Modifier No. | Modifier weight (mg/m²) | Modifier coating weight (mg/m²) | Half-life (sec) | Coefficient of high-speed dynamic friction | Antiblocking properties |
|---|---|---|---|---|---|---|---|---|
| Ex. 3 | 1 | 550 | a-2 | 5 | 5.6 | 41 | 0.29 | |
| | | | d-1 | 5 | | | | ⊙ |
| | | 450 | No application | | 4.2 | 45 | 0.29 | |
| | 2 | 550 | a-2 | 5 | 5.8 | 40 | 0.27 | |
| | | | d-1 | 5 | | | | ⊙ |
| | | 350 | No application | | 3.9 | 47 | 0.32 | |
| | 3 | 460 | a-7 | 5 | 5.5 | 41 | 0.29 | |
| | | | d-1 | 5 | | | | ⊙ |
| | | 400 | No application | | 4.2 | 45 | 0.30 | |
| Com. Ex. 3 | 1 | 610 | a-2 | 5 | — | — | — | |
| | | | d-1 | 5 | | | | X |
| | | Untreated | No application | | | | | |
| | 2 | 400 | a-2 | 5 | 2.0–9.0 | — | — | — |
| | | | d-2 | 5 | | | | |
| | | 400 | No application | | 1.7–9.3 | — | — | — |
| | 3 | 520 | a-2 | 5 | 2.1–8.4 | — | — | — |
| | | | d-1 | 5 | | | | |
| | | 460 | No application | | 2.2–8.8 | — | — | — |

In the above Table, the upper and lower columns of each Experimental No. show respectively the front face (A) and the back face (B).

TABLE 11

| | | | Ex. 4 | | | | | | | | |
|---|---|---|---|---|---|---|---|---|---|---|---|
| Experimental No. | | | 1 | 2 | 3 | 4 | 5 | 6 | 7 | 8 | 9 |
| Resin composition No. | | | P4 | P4 | P3 | P5 | P7 | P8 | P6 | P4 | P4 |
| Surface roughness | | Surface (A) | 1.04 | 1.04 | 0.52 | 2.19 | 0.72 | 0.72 | 0.92 | 1.04 | 1.04 |
| | | Surface (B) | 1.02 | 1.02 | 0.50 | 2.09 | 0.72 | 0.66 | 0.94 | 1.02 | 1.02 |
| Coating wt. | Microparticle | Type | c-4 | c-2 | c-4 | c-4 | c-4 | c-4 | c-4 | c-2 | c-2 |
| | | Surface (A) | 0.8 | 0.8 | 1.0 | 1.0 | 1.0 | 1.0 | 1.0 | 1.0 | 1.8 |
| | | Surface (B) | 0.5 | 0.5 | 0.7 | 0.7 | 0.7 | 0.7 | 0.7 | 0.6 | 1.5 |
| | Surfactant | Type | a-4 | a-1 | a-2 | a-2 | a-2 | a-2 | a-2 | a-2 | a-4 |
| | | Surface (A) | 7.3 | 7.3 | 8.4 | 8.4 | 8.4 | 8.4 | 8.4 | 8.0 | 10.0 |
| | | Surface (B) | 5.0 | 5.0 | 6.2 | 6.2 | 6.2 | 6.2 | 6.2 | 6.0 | 8.2 |
| | Water soluble polymer | Type | b-1 | b-3 | b-1 | b-1 | b-1 | b-1 | b-1 | b-2 | b-1 |
| | | Surface (A) | 1.5 | 1.5 | 1.8 | 1.8 | 1.8 | 1.8 | 1.8 | 1.8 | 6.0 |
| | | Surface (B) | 1.2 | 1.2 | 1.5 | 1.5 | 1.5 | 1.5 | 1.5 | 1.4 | 5.8 |
| Coefficient of high-speed dynamic friction | | Surface (A) | 0.27 | 0.28 | 0.32 | 0.32 | 0.27 | 0.26 | 0.24 | 0.32 | 0.34 |
| | | Surface (B) | 0.28 | 0.29 | 0.31 | 0.33 | 0.28 | 0.26 | 0.26 | 0.31 | 0.33 |

TABLE 11-continued

|  |  | Ex. 4 |  |  |  |  |  |  |  |  |
|---|---|---|---|---|---|---|---|---|---|---|
| Experimental No. | | 1 | 2 | 3 | 4 | 5 | 6 | 7 | 8 | 9 |
| Half-life | Surface (A) | 37 | 32 | 28 | 29 | 27 | 28 | 25 | 31 | 37 |
|  | Surface (B) | 35 | 34 | 29 | 28 | 29 | 27 | 27 | 30 | 39 |
| Evaluation in window film applicator | Positioning error | ⊚ | ⊚ | ⊚ | ⊚ | ⊚ | ⊚ | ⊚ | ⊚ | ⊚ |
|  | Wrinkling | ⊚ | ⊚ | ⊚ | ○ | ⊚ | ⊚ | ⊚ | ⊚ | ○ |
|  | Scuff mark | ⊚ | ⊚ | ○ | ⊚ | ⊚ | ⊚ | ⊚ | ⊚ | ⊚ |
| Shear in bag-forming with automatic filling machine | | ⊚ | ⊚ | ⊚ | ⊚ | ⊚ | ⊚ | ⊚ | ⊚ | ⊚ |

TABLE 12

|  |  |  | Ex. 4 |  |  |  |  |  |  |  |  |
|---|---|---|---|---|---|---|---|---|---|---|---|
| Experimental No. | | | 10 | 11 | 12 | 13 | 14 | 15 | 16 | 17 | 18 |
| Resin composition No. | | | P1 | P5 | P8 | P3 | P3 | P3 | P3 | P3 | P4 |
| Surface roughness | Surface (A) | | 0.39 | 2.52 | 2.33 | 1.04 | 1.04 | 1.04 | 1.04 | 1.04 | 1.04 |
|  | Surface (B) | | 0.37 | 2.34 | 2.29 | 1.02 | 1.02 | 1.02 | 1.02 | 1.02 | 1.02 |
| Coating wt. | Micro-particle | Type | c-4 | c-4 | c-4 | c-1 | c-3 | c-5 | c-2 | c-2 | c-4 |
|  |  | Surface (A) | 1.0 | 1.0 | 1.0 | 1.0 | 1.0 | 1.0 | 1.0 | 3.6 | 0.8 |
|  |  | Surface (B) | 0.7 | 0.7 | 0.7 | 0.6 | 0.6 | 0.6 | 0.6 | 3.2 | 0.5 |
|  | Surfactant | Type | a-2 | a-1 | a-2 | a-2 | a-2 | a-2 | a-2 | a-2 | a-4 |
|  |  | Surface (A) | 8.4 | 8.4 | 8.4 | 8.0 | 8.0 | 8.0 | 12.5 | 21.5 | 7.3 |
|  |  | Surface(B) | 6.2 | 6.2 | 6.2 | 6.0 | 6.0 | 6.0 | 11.2 | 19.3 | 5.0 |
|  | Water soluble polymer | Type | b-1 | b-1 | b-1 | b-2 | b-2 | b-2 | b-2 | b-2 | b-1 |
|  |  | Surface (A) | 1.8 | 1.8 | 1.8 | 1.8 | 1.8 | 1.8 | 2.3 | 1.8 | 1.5 |
|  |  | Surface (B) | 1.5 | 1.5 | 1.5 | 1.4 | 1.4 | 1.4 | 2.0 | 1.4 | 1.2 |
| Coefficient of high-speed dynamic friction | Surface (A) | | 0.38 | 0.37 | 0.39 | 0.36 | 0.40 | 0.33 | 0.40 | 0.33 | 0.26 |
|  | Surface (B) | | 0.37 | 0.40 | 0.37 | 0.37 | 0.40 | 0.31 | 0.37 | 0.34 | 0.28 |
| Half-life | Surface (A) | | 30 | 29 | 28 | 29 | 27 | 28 | 30 | 19 | 35 |
|  | Surface (B) | | 27 | 27 | 28 | 28 | 29 | 27 | 27 | 15 | 37 |
| Evaluation in window film applicator | Positioning error | | ⊚ | Δ | Δ | ○ | ○ | ⊚ | ⊚ | Δ | ⊚ |
|  | Wrinkling | | ○ | Δ | ○ | ○ | ○ | ⊚ | ⊚ | ○ | ⊚ |
|  | Scuff mark | | Δ | ⊚ | ⊚ | ⊚ | ○ | Δ | Δ | ⊚ | ⊚ |
| Shear in bag-forming with automatic filling machine | | | ○ | ○ | ○ | ○ | ○ | ○ | ○ | ○ | ⊚ |

TABLE 13

|  |  |  | Comp. Ex. 4 |  | Ref. Ex. 4 |  |
|---|---|---|---|---|---|---|
| Experimental No. | | | 1 | 2 | 1 | 2 |
| Resin composition No. | | | P4 | P4 | P4 | P4 |
| Surface roughness | Surface (A) | | 1.04 | 1.04 | 1.04 | 1.04 |
|  | Surface (B) | | 1.02 | 1.02 | 1.02 | 1.02 |
| Coating wt. | Micro-particle | Type | c-4 | No | c-4 | c-1 |
|  |  | Surface (A) | 0.8 | — | 0.8 | 2.6 |
|  |  | Surface (B) | 0.5 | — | 0.5 | 2.4 |
|  | Surfactant | Type | No | a-4 | a-2 | a-2 |
|  |  | Surface (A) | — | 7.3 | 7.3 | 7.3 |
|  |  | Surface (B) | — | 5.0 | 5.0 | 5.0 |
|  | Water soluble polymer | Type | b-1 | b-1 | No | No |
|  |  | Surface (A) | 1.5 | 1.5 | — | — |
|  |  | Surface (B) | 1.2 | 1.2 | — | — |
| Coefficient of high-speed dynamic friction | Surface (A) | | 0.31 | 0.59 | 0.26 | 0.24 |
|  | Surface (B) | | 0.32 | 0.59 | 0.27 | 0.25 |
| Half-life | Surface (A) | | >300 | 39 | 40 | 42 |
|  | Surface (B) | | >300 | 46 | 41 | 41 |
| Evaluation in window film applicator | Positioning error | | X | X | ⊚ | ○ |
|  | Wrinkling | | X | X | ○ | ○ |
|  | Scuff mark | | ⊚ | ○ | Δ | X |
| Shear in bag-forming with automatic filling machine | | | X | Δ | ⊚ | ⊚ |

TABLE 14

| | | | Ex. 5 | | | | | | |
|---|---|---|---|---|---|---|---|---|---|
| Experimental No. | | | 1 | 2 | 3 | 4 | 5 | 6 | 7 |
| Coating wt. | Polyether-modified silicone | Type | d-1 | d-1 | d-2 | d-2 | d-3 | d-1 | d-1 |
| | | Surface (A) | 2.8 | 2.8 | 2.8 | 2.8 | 2.8 | 4.9 | 2.3 |
| | | Surface (B) | 2.5 | 2.5 | 2.5 | 2.5 | 2.5 | 4.7 | 2.1 |
| | Surfactant | Type | a-4 | a-6 | a-4 | a-6 | a-1 | a-1 | a-1 |
| | | Surface (A) | 7.3 | 7.3 | 7.3 | 7.3 | 7.3 | 7.3 | 7.3 |
| | | Surface (B) | 5.0 | 5.0 | 5.0 | 5.0 | 5.0 | 5.0 | 5.0 |
| | Water soluble polymer | Type | b-1 | b-3 | b-1 | b-1 | b-1 | b-1 | b-1 |
| | | Surface (A) | 1.5 | 1.5 | 1.8 | 1.8 | 1.8 | 1.8 | 1.8 |
| | | Surface (B) | 1.2 | 1.2 | 1.5 | 1.5 | 1.5 | 1.5 | 1.5 |
| Coefficient of high-speed dynamic friction | | Surface (A) | 0.18 | 0.19 | 0.19 | 0.21 | 0.21 | 0.17 | 0.24 |
| | | Surface (B) | 0.19 | 0.20 | 0.21 | 0.22 | 0.22 | 0.18 | 0.26 |
| Half-life | | Surface (A) | 35 | 36 | 38 | 41 | 37 | 42 | 34 |
| | | Surface (B) | 37 | 38 | 39 | 43 | 39 | 46 | 36 |
| Transparency of film | | | ⊚ | ⊚ | ⊚ | ⊚ | ⊚ | ○ | ⊚ |
| Antiblocking properties of film | | | ⊚ | ⊚ | ⊚ | ⊚ | ⊚ | ⊚ | ⊚ |
| Evaluation in window film applicator | Positioning error | | ⊚ | ⊚ | ⊚ | ⊚ | ⊚ | ⊚ | ⊚ |
| | Wrinkling | | ⊚ | ⊚ | ⊚ | ⊚ | ⊚ | ⊚ | ⊚ |
| | Scuff mark | | ⊚ | ⊚ | ⊚ | ⊚ | ⊚ | ⊚ | ⊚ |
| Shear in bag-forming with automatic filling machine | | | ⊚ | ⊚ | ⊚ | ⊚ | ⊚ | ⊚ | ⊚ |

TABLE 15

| | | | Ref. Ex. 5 | Comp. Ex. 5 | |
|---|---|---|---|---|---|
| Experimental No. | | | 1 | 1 | 2 |
| Coating wt. | Polyether-modified silicone | Type | d-1 | d-1 | — |
| | | Surface (A) | 2.8 | 2.8 | — |
| | | Surface (B) | 2.5 | 2.5 | — |
| | Surfactant | Type | a-4 | — | a-4 |
| | | Surface (A) | 7.3 | — | 7.3 |
| | | Surface (B) | 5.0 | — | 5.0 |
| | Water soluble polymer | Type | — | b-3 | b-1 |
| | | Surface (A) | — | 1.5 | 1.8 |
| | | Surface (B) | — | 1.2 | 1.5 |
| Coefficient of high-speed dynamic friction | | Surface (A) | 0.18 | 0.19 | 0.59 |
| | | Surface (B) | 0.19 | 0.20 | 0.60 |
| Half-life | | Surface (A) | 35 | >300 | 38 |
| | | Surface (B) | 37 | >300 | 39 |
| Transparency of film | | | ⊚ | ⊚ | ⊚ |
| Antiblocking properties of film | | | ⊚ | ⊚ | X |
| Evaluation in window film applicator | Positioning error | | Δ | X | X |
| | Wrinkling | | Δ | X | X |
| | Scuff mark | | ⊚ | ⊚ | Δ |
| Shear in bag-forming with automatic filling machine | | | ○ | X | X |

TABLE 16

| | | | | Ex. 6 | | | | | | | | | |
|---|---|---|---|---|---|---|---|---|---|---|---|---|---|
| | | | | 1 | 2 | 3 | 4 | 5 | 6 | 7 | 8 | 9 | 10 |
| Coating comp. Type Wt. | (a) Polyether-modified silicone | No. | | d-1 | d-1 | d-2 | d-2 | d-3 | d-1 | d-1 | d-2 | d-2 | d-1 |
| | | Wt. (mg/m²) | Surface (A) | 2.5 | 2.5 | 2.5 | 2.5 | 2.5 | 4.9 | 2.1 | 4.9 | 2.1 | 4.9 |
| | | | Surface (B) | 2.3 | 2.3 | 2.3 | 2.3 | 2.3 | 4.7 | 1.9 | 4.7 | 1.9 | 4.7 |
| | (b) Surfactant | No. | | a-2 | a-5 | a-2 | a-5 | a-2 | a-2 | a-2 | a-5 | a-5 | a-5 |
| | | Wt. (mg/m²) | Surface (A) | 2.5 | 2.5 | 2.5 | 2.5 | 2.5 | 2.1 | 4.9 | 2.1 | 4.9 | 2.1 |
| | | | Surface (B) | 2.3 | 2.3 | 2.3 | 2.3 | 2.3 | 1.9 | 4.7 | 1.9 | 4.7 | 1.9 |
| Surface | Half-life of static friction | | Surface (A) | 35 | 40 | 38 | 40 | 41 | 33 | 25 | 35 | 29 | 27 |

TABLE 16-continued

|  |  |  | Ex. 6 | | | | | | | | | |
|---|---|---|---|---|---|---|---|---|---|---|---|---|
|  |  |  | 1 | 2 | 3 | 4 | 5 | 6 | 7 | 8 | 9 | 10 |
| pro-<br>per-<br>ties<br>of<br>film | electricity<br>(sec) | Surface<br>(B) | 37 | 42 | 38 | 43 | 42 | 35 | 27 | 37 | 32 | 28 |
|  | Coefficient of<br>high-speed | Surface<br>(A) | 0.18 | 0.20 | 0.19 | 0.21 | 0.22 | 0.17 | 0.21 | 0.18 | 0.20 | 0.18 |
|  | dynamic<br>friction | Surface<br>(B) | 0.19 | 0.19 | 0.21 | 0.22 | 0.21 | 0.18 | 0.21 | 0.17 | 0.20 | 0.18 |
| Transparency of film | | | ◉ | ◉ | ◉ | ◉ | ◉ | ○ | ◉ | ○ | ◉ | ○ |
| Antiblocking properties of film | | | ◉ | ◉ | ◉ | ◉ | ◉ | ◉ | ◉ | ◉ | ◉ | ◉ |
| Evaluation in<br>window film<br>applicator | Positioning error | | ◉ | ◉ | ◉ | ◉ | ◉ | ◉ | ◉ | ◉ | ◉ | ◉ |
|  | Film winding | | ◉ | ◉ | ◉ | ◉ | ◉ | ◉ | ◉ | ◉ | ◉ | ◉ |
| Shear in bag-forming with<br>automatic filling machine | | | ◉ | ◉ | ◉ | ◉ | ◉ | ◉ | ◉ | ◉ | ◉ | ◉ |

TABLE 17

|  |  |  |  | Comp. Ex. 6 | | | | | | | | |
|---|---|---|---|---|---|---|---|---|---|---|---|---|
| Experimental No. | | | | 1 | 2 | 3 | 4 | 5 | 6 | 7 | 8 | 9 |
| Coat-<br>ing<br>comp.<br>Type<br>Wt. | (a)<br>Polyether-<br>modified<br>silicone | No.<br>Wt.<br>(mg/<br>m²) | Surface<br>(A)<br>Surface<br>(B) | d-1<br>2.5<br>2.3 | d-1<br>5.0<br>4.8 | d-1<br>10.0<br>9.8 | —<br>0<br>0 | —<br>0<br>0 | —<br>0<br>0 | d-3<br>2.5<br>2.3 | d-3<br>2.5<br>2.3 | d-2<br>2.1<br>1.9 |
|  | (b)<br>Surfac-<br>tant | No.<br>Wt.<br>(mg/<br>m²) | Surface<br>(A)<br>Surface<br>(B) | —<br>0<br>0 | —<br>0<br>0 | —<br>0<br>0 | a-2<br>2.5<br>2.3 | a-2<br>5.0<br>4.8 | a-2<br>10.0<br>9.8 | a-1<br>2.5<br>2.3 | a-3<br>2.5<br>2.3 | a-4<br>4.9<br>4.7 |
| Sur-<br>face<br>pro-<br>per-<br>ties<br>of<br>film | Half-life of<br>static<br>electricity<br>(sec) | | Surface<br>(A)<br>Surface<br>(B) | >300<br>>300 | >200<br>>200 | >90<br>>90 | 78<br>75 | 36<br>34 | 17<br>15 | >300<br>>300 | >300<br>>300 | 110<br>128 |
|  | Coefficient of<br>high-speed<br>dynamic<br>friction | | Surface<br>(A)<br>Surface<br>(B) | 0.25<br>0.24 | 0.21<br>0.21 | 0.19<br>0.19 | 0.33<br>0.33 | 0.27<br>0.28 | 0.24<br>0.24 | 0.28<br>0.26 | 0.29<br>0.26 | 0.61<br>0.63 |
| Transparency of film | | | | ◉ | ○ | Δ | ◉ | ◉ | ○ | ◉ | ○ | ◉ |
| Antiblocking properties of film | | | | ○ | ◉ | ◉ | X | X | X | ○ | ○ | X |
| Evaluation in<br>window film<br>applicator | Positioning error | | | X | X | Δ | | ◉ | ◉ | X | X | Δ |
|  | Film winding | | | ◉ | ◉ | ◉ | ◉ | ○ | | X | X | Δ |
| Shear in bag-forming with<br>automatic filling machine | | | | X | X | Δ | X | X | X | X | X | X |

What is claimed is:

1. A styrene resin film comprising a styrene resin film base subjected to a hydrophilic treatment on both surfaces and a composition comprising at least an antistatic agent and an external slip agent applied onto each of the treated surfaces, wherein the ratio ($\alpha/\beta$) of the surface tension ($\alpha$) of one treated surface (A) of said film base to the surface tension ($\beta$) of the opposite treated surface (B) is from 1.15 to 1.72; the surface tension ($\beta$) is from 350 $\mu$N/cm to 450 $\mu$N/cm; the surface tension ($\alpha$) is from 400 $\mu$N/cm to 600 $\mu$N/cm; and the coating weight of the composition on the treated surface (B) amounts to 25 to 95% by weight of the coating weight of the composition on the treated surface (A).

2. The styrene resin film as claimed in claim 1, wherein said composition applied on the treated film base surface (A) and the treated film base surface (B) comprises a surfactant as the antistatic agent, inorganic microparticles as the external slip agent and, furthermore, a water soluble polymer.

3. The styrene resin film as claimed in claim 1, wherein said composition applied on the treated film base surface (A) and the treated film base surface (B) further comprises a surfactant as the antistatic agent, a polyether-modified silicone having a structure represented by the following formula (1) as the external slip agent and, furthermore, a water soluble polymer:

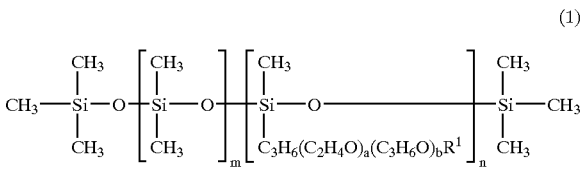

(1)

wherein $R^1$ represents a hydrogen atom or an alkyl group having 1 to 4 carbon atoms; m is an integer of from 0 to 80 and n is an integer of from 1 to 30, provided that m+n is an integer of from 1 to 100 and the ratio n/(n+m) is from 0.1 to 1.0; and a is an integer of from 5 to 30 and b is an integer of from 0 to 30, provided that a+b is an integer of from 5 to 60 and the ratio a:b is from 100:0 to 100:50.

4. The styrene resin film as claimed in claim 1, wherein said composition applied on the treated film base surface (A) and the treated film base surface (B) comprises, as the antistatic agent, a polyoxyethylenealkylamine having a structure represented by the following formula (2) or a polyoxyethylene polyoxypropylene glycol ether having a structure represented by the following formula (3) and, as the external slip agent, (a) a polyether-modified silicone having a structure represented by the following formula (1):

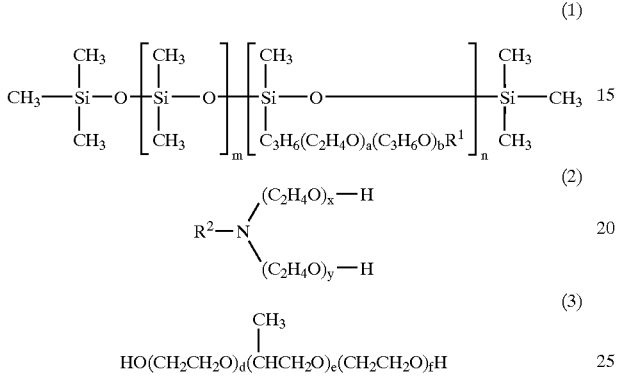

wherein, in formula (1), $R^1$ represents a hydrogen atom or an alkyl group having 1 to 4 carbon atoms; m is an integer of from 0 to 80 and n is an integer of from 1 to 30, provided that m+n is an integer of from 1 to 100 and the ratio n/(n+m) is from 0.1 to 1.0; and a is an integer of from 5 to 30 and b is an integer of from 0 to 30, provided that a+b is an integer of from 5 to 60 and the ratio a:b is from 100:0 to 100:50;

in formula (2), $R^2$ represents an alkyl group having 8 to 22 carbon atoms; x is an integer of from 1 to 30; and y is an integer of from 1 to 30; and in the compound represented by formula (3), the total weight of the repeating unit d and the repeating unit f amounts to 40 to 95% of the whole molecule.

5. The styrene resin film as claimed in any one of claims 1 to 4, wherein both surfaces of the film base have a center-line average of surface roughness parameter falling within a range of from 0.4 to 2.2 µm.

6. An envelope comprising a styrene resin film according to claim 1 as a window portion for use in window film application.

7. The styrene resin film for use in window film application as claimed in claim 1, wherein said composition applied on the treated film base surface (A) and the treated film base surface (B) comprises (a) from 10 to 85% by weight of a polyether-modified silicone having a structure represented by the following formula (1), and (b) from 15 to 90% by weight of a polyoxyethylenealkylamine having a structure represented by the following formula (2) or a polyoxyethylene polyoxypropylene glycol ether; said composition is applied to the treated film base surfaces (A) and (B) each at a coating weight of form 2 to 30 mg/m²; and both of the film surfaces having the composition applied thereon show a coefficient of high-speed dynamic friction to metals of from 0.15 to 0.35 and a half-life of the electrostatic attenuation at 20° C. and a relative humidity of 20% of 60 seconds or less:

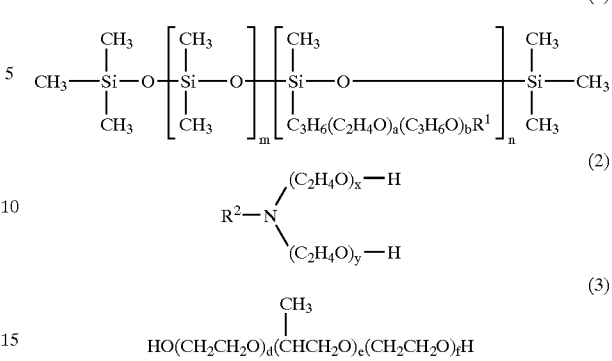

wherein, in formula (1), $R^1$ represents a hydrogen atom or an alkyl group having 1 to 4 carbon atoms; m is an integer of from 0 to 80 and n is an integer of from 1 to 30, provided that m+n is an integer of from 1 to 100 and the ratio n/(n+m) is from 0.1 to 1.0; and a is an integer of from 5 to 30 and b is an integer of from 0 to 30, provided that a+b is an integer of from 5 to 60 and the ratio a:b is from 100:0 to 100:50;

in formula (2), $R^2$ represents an alkyl group having 8 to 22 carbon atoms; x is an integer of from 1 to 30; and y is an integer of from 1 to 30; and in the compound represented by formula (3), the total weight of the repeating unit d and the repeating unit f amounts to 40 to 95% of the whole molecule.

8. A styrene resin film for use in window film application, comprising a styrene resin film base subjected to a hydrophilic treatment on both surfaces and a composition comprising at least an antistatic agent and an external slip agent applied onto each of the treated surfaces, wherein the ratio (α/β) of the surface tension (α) of one treated surface (A) of said film base to the surface tension (β) of the opposite treated surface (B) is from 1.15 to 1.72; the surface tension (β) is from 350 µN/cm to 450 µN/cm; the surface tension (α) is from 400 µN/cm to 600 µN/cm; the coating weight of the composition on the treated surface (A) of the film base is from 4.5 mg/m² to 30 mg/m²;, the coating weight of the composition on the treated surface (B) of the film base is from 2.0 mg/m² to 15 mg/m²; wherein the difference between an adhesion time of the coating composition on treated surface (A), when applied to paper and an adhesion time of the coating composition on treated surface (B), when applied to paper is 1.0 second or more; and the adhesion time of the coating composition on treated surface (B), when applied to paper is 30 seconds or less.

9. A process for producing a styrene resin film which comprises: performing a hydrophilic treatment so that the surface tension (α) of one treated surface (A) of a film base is controlled to 400 to 600 µN/cm, the surface tension (β) of the opposite treated surface (B) of the film base is controlled to 350 to 450 µN/cm and the surface tension ratio α/β is controlled to 1.15 to 1.72; applying a composition comprising at least an antistatic agent and an external slip agent onto said treated surface (A); after drying, winding up the styrene resin film into a roll; and thus transferring the composition on the treated surface (A) to the treated surface (B).

10. The process for producing a styrene resin film as claimed in claim 9, wherein said composition comprising said antistatic agent and said external slip agent further comprises a water soluble polymer, and wherein said external slip agent consists of inorganic microparticles and wherein said antistatic agent consists of a surfactant.

11. The process for producing a styrene resin film as claimed in claim 9, wherein said composition comprising said antistatic agent and said external slip agent further comprises a water soluble polymer, wherein said external slip agent consists of a polyether-modified silicone represented by the following formula (1), and wherein said antistatic agent consists of a surfactant:

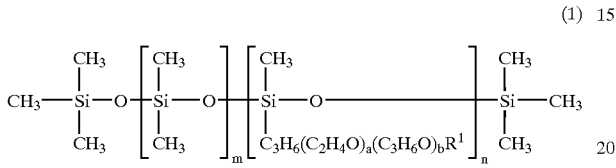

(1)

wherein $R^1$ represents a hydrogen atom or an alkyl group having 1 to 4 carbon atoms; m is an integer of from 0 to 80 and n is an integer of from 1 to 30, provided that m+n is an integer of from 1 to 100 and the ratio n/(n+m) is from 0.1 to 1.0; and a is an integer of from 5 to 30 and b is an integer of from 0 to 30, provided that a+b is an integer of from 5 to 60 and the ratio a:b is from 100:0 to 100:50.

12. The process for producing a styrene resin film as claimed in claim 9, wherein said external slip agent consists of a polyether-modified silicone represented by the following formula (1), and said antistatic agent consists of a polyoxyethylenealkylamine represented by the following formula (2) or a polyoxyethylene polyoxypropylene glycol ether represented by the following formula (3):

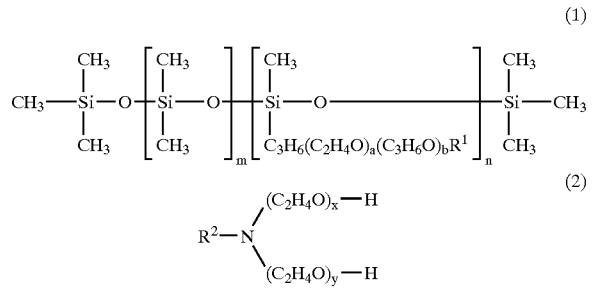

(1)

(2)

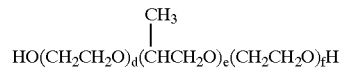

(3)

wherein, in formula (1), $R^1$ represents a hydrogen atom or an alkyl group having 1 to 4 carbon atoms; m is an integer of from 0 to 80 and n is an integer of from 1 to 30, provided that m+n is an integer of from 1 to 100 and the ratio n/(n+m) is from 0.1 to 1.0; and a is an integer of from 5 to 30 and b is an integer of from 0 to 30, provided that a+b is an integer of from 5 to 60 and the ratio a:b is from 100:0 to 100:50;

in formula (2), $R^2$ represents an alkyl group having 8 to 22 carbon atoms; x is an integer of from 1 to 30; and y is an integer of from 1 to 30; and in the compound represented by formula (3), the total weight of the repeating unit d and the repeating unit f amounts to 40 to 95% of the whole molecule.

* * * * *